(12) United States Patent
Takaira

(10) Patent No.: US 11,400,939 B2
(45) Date of Patent: Aug. 2, 2022

(54) FOUR-WHEEL DRIVE VEHICLE

(71) Applicant: Toyota Jidosha Kabushiki Kaisha, Toyota (JP)

(72) Inventor: Koji Takaira, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/225,300

(22) Filed: Apr. 8, 2021

(65) Prior Publication Data
US 2021/0339749 A1 Nov. 4, 2021

(30) Foreign Application Priority Data

Apr. 30, 2020 (JP) .............................. JP2020-080809

(51) Int. Cl.
*B60W 30/20* (2006.01)
*B60W 10/119* (2012.01)
(Continued)

(52) U.S. Cl.
CPC ............ *B60W 30/20* (2013.01); *B60W 10/06* (2013.01); *B60W 10/119* (2013.01);
(Continued)

(58) Field of Classification Search
CPC .... B60W 30/20; B60W 10/06; B60W 10/119; B60W 30/188; B60W 2030/206; B60W 2540/10; B60W 10/10; B60W 2030/203; B60W 2520/403; B60W 2520/14; B60W 2510/20; B60W 2710/0644; B60W 30/045; B60W 30/018145
See application file for complete search history.

(56) References Cited

U.S. PATENT DOCUMENTS 9,394,873 B2 * 7/2016 Fujita ................... F02N 11/087
2012/0190499 A1   7/2012 Oba
(Continued)

FOREIGN PATENT DOCUMENTS

CN        111661031 A * 9/2020 ............ B60W 10/06
JP       2009214598 A * 9/2009
WO    WO 2011/042951 A1   4/2011

*Primary Examiner* — Roger L Pang
(74) *Attorney, Agent, or Firm* — Oblon, McClelland, Maier & Neustadt, L.L.P.

(57) ABSTRACT

A four-wheel drive vehicle includes: a drive-power distribution device for transmitting a drive power of an engine toward main and auxiliary drive wheels, at a drive-power distribution ratio between the auxiliary drive wheels and the main drive wheels; and a control apparatus for executing a drive-power distribution control for adjusting the drive-power distribution ratio, and executing an engine automatic-start control for causing the engine to be started upon satisfaction of an engine-start condition. Upon execution of the engine automatic-start control, the control apparatus changes a target engine rotational speed from a predetermined engine-start rotational speed to a changed engine rotational speed, such that a difference of the changed engine rotational speed from a resonance rotational speed that causes resonance of a drive system to which the engine is connected in a power transmittable manner, is larger than a difference of the predetermined engine-start rotational speed from the resonance rotational speed.

8 Claims, 9 Drawing Sheets

(51) Int. Cl.
*B60W 10/06* (2006.01)
*B60W 30/188* (2012.01)
*F02N 11/08* (2006.01)

(52) U.S. Cl.
CPC ....... *B60W 30/188* (2013.01); *F02N 11/0814* (2013.01); *B60W 2030/206* (2013.01); *B60W 2510/20* (2013.01); *B60W 2520/14* (2013.01); *B60W 2540/10* (2013.01); *B60W 2710/0644* (2013.01)

(56) References Cited

U.S. PATENT DOCUMENTS

2016/0251010 A1* 9/2016 Hata .................... B60W 10/26
701/22
2019/0345906 A1* 11/2019 Fuki ...................... F02D 41/062

\* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

FOUR-WHEEL DRIVE VEHICLE

This application claims priority from Japanese Patent Application No. 2020-080809 filed on Apr. 30, 2020, the disclosure of which is herein incorporated by reference in its entirety.

FIELD OF THE INVENTION

The present invention relates to a four-wheel drive vehicle in which a ratio of distribution of a drive power between main and auxiliary drive wheels is adjustable.

BACKGROUND OF THE INVENTION

There is well-known a four-wheel drive vehicle including (a) main drive wheels and auxiliary drive wheels, (b) a drive power source including at least an engine, (c) a drive-power distribution device configured to transmit a drive power of the drive power source toward the main drive wheels and the auxiliary drive wheels, at a drive-power distribution ratio that is a ratio of distribution of the drive power between the main drive wheels and the auxiliary drive wheels, and (d) a control apparatus configured to execute a drive-power distribution control for adjusting the drive-power distribution ratio, and configured to execute an engine automatic-start control for causing the engine to be automatically started upon satisfaction of an engine-start condition. A four-wheel drive vehicle is disclosed in WO/2011/042951 is an example of such a vehicle.

SUMMARY OF THE INVENTION

By the way, a drive system, to which the engine is connected in a power transmittable manner, has a resonance rotational speed that is dependent on its mass and torsional rigidity. Therefore, when an engine automatic-start control is executed, resonance of the drive system could occur depending on a frequency of torque fluctuation of the engine, and vibration of the drive system is increased upon occurrence of the resonance. Thus, there is a risk of increase of NV as a result of the increased vibration of the drive system, wherein the NV is a generic term including noise generated in the vehicle and vibration sensible by passengers in the vehicle. In the four-wheel drive vehicle as described above, the mass and the torsional rigidity of the drive system are changed depending on the drive-power distribution ratio, so that the resonance rotational speed of the drive system is changed depending on the drive-power distribution ratio. Therefore, in the four-wheel drive vehicle as described above, there is a problem that, when the engine automatic-start control is executed, the resonance of the drive system could easily occur due to the torque fluctuation of the engine whereby the NV could be easily increased.

The present invention was made in view of the background art described above. It is therefore an object of the present invention to provide a four-wheel drive vehicle capable of suppressing or preventing increase of the NV due to increase of vibration of a drive system upon execution of an engine automatic-start control.

The object indicated above is achieved according to the following aspects of the present invention.

According to a first aspect of the invention, there is provided a four-wheel drive vehicle comprising: (a) main drive wheels and auxiliary drive wheels; (b) at least one drive power source including an engine; (c) a drive-power distribution device configured to transmit a drive power of the drive power source toward the main drive wheels and the auxiliary drive wheels, at a drive-power distribution ratio that is a ratio of distribution of the drive power between the auxiliary drive wheels and the main drive wheels; and (d) a control apparatus configured to execute a drive-power distribution control for adjusting the drive-power distribution ratio, and configured to execute an engine automatic-start control for causing the engine to be automatically started upon satisfaction of an engine-start condition, wherein the control apparatus is configured, upon execution of the engine automatic-start control, to change a target engine rotational speed that is a target speed value of a rotational speed of the engine after a complete combustion of the engine, from a predetermined engine-start rotational speed, to a changed engine rotational speed, depending on the drive-power distribution ratio, such that a difference of the changed engine rotational speed from a resonance rotational speed that causes resonance of a drive system to which the engine is connected in a power transmittable manner, is larger than a difference of the predetermined engine-start rotational speed from the resonance rotational speed.

According to a second aspect of the invention, in the four-wheel drive vehicle according to the first aspect of the invention, the control apparatus is configured to set the target engine rotational speed to the changed engine rotational speed that is different, by a predetermined speed value, from the resonance rotational speed that is calculated based on the drive-power distribution ratio, wherein the predetermined speed value is a predetermined value for setting the changed engine rotational speed as the target engine rotational speed, which makes it possible to avoid or suppress occurrence of resonance of the drive system and to suppress an amount of change of the target engine rotational speed from the predetermined engine-start rotational speed to the changed engine rotational speed.

According to a third aspect of the invention, in the four-wheel drive vehicle according to the first or second aspect of the invention, the predetermined engine-start rotational speed is an optimum speed value of the rotational speed of the engine, which maximizes an energy efficiency in the four-wheel drive vehicle.

According to a fourth aspect of the invention, in the four-wheel drive vehicle according to any one of the first through third aspects of the invention, the control apparatus includes, in addition to a function of changing the target engine rotational speed, a function of changing the drive-power distribution ratio upon the execution of the engine automatic-start control, from an unchanged distribution ratio that is a ratio value of the drive-power distribution ratio when the engine automatic-start control is not executed, to a changed distribution ratio, such that the difference of the predetermined engine-start rotational speed from the resonance rotational speed is increased by change of the drive-power distribution ratio from the unchanged distribution ratio to the changed distribution ratio, wherein the control apparatus is configured, upon the execution of the engine automatic-start control, to execute one of change of the target engine rotational speed and change of the drive-power distribution ratio, which is selected depending on a state of the four-wheel drive vehicle.

According to a fifth aspect of the invention, in the four-wheel drive vehicle according to the fourth aspect of the invention, the control apparatus is configured, when an accelerating operation amount or a requested drive amount is not smaller than a threshold value, to change the target engine rotational speed such that the difference of the changed engine rotational speed from the resonance rotational speed is larger than the difference of the predetermined engine-start rotational speed from the resonance rotational speed, and is configured, when the accelerating operation amount or the requested drive amount is smaller than the threshold value, to change the drive-power distribution ratio such that the difference of the predetermined engine-start rotational speed from the resonance rotational speed is increased by the changed ratio value of the drive-power distribution ratio.

According to a sixth aspect of the invention, in the four-wheel drive vehicle according to the fourth or fifth aspect of the invention, the control apparatus is configured, when a yaw rate is not smaller than a threshold value, to change the target engine rotational speed such that the difference of the changed engine rotational speed from the resonance rotational speed is larger than the difference of the predetermined engine-start rotational speed from the resonance rotational speed, and is configured, when the yaw rate is smaller than the threshold value, to change the drive-power distribution ratio such that the difference of the predetermined engine-start rotational speed from the resonance rotational speed is increased by the changed ratio value of the drive-power distribution ratio.

According to a seventh aspect of the invention, in the four-wheel drive vehicle according to any one of the fourth through sixth aspects of the invention, the control apparatus is configured, when a steering angle is not smaller than a threshold value, to change the target engine rotational speed such that the difference of the changed engine rotational speed from the resonance rotational speed is larger than the difference of the predetermined engine-start rotational speed from the resonance rotational speed, and is configured, when the steering angle is smaller than the threshold value, to change the drive-power distribution ratio such that the difference of the predetermined engine-start rotational speed from the resonance rotational speed is increased by the changed ratio value of the drive-power distribution ratio.

According to an eighth aspect of the invention, in the four-wheel drive vehicle according to any one of the fourth through seventh aspects of the invention, the control apparatus is configured, when the four-wheel drive vehicle is turning, to change the target engine rotational speed such that the difference of the changed engine rotational speed from the resonance rotational speed is larger than the difference of the predetermined engine-start rotational speed from the resonance rotational speed, and is configured, when the four-wheel drive vehicle is running straight, to change the drive-power distribution ratio such that the difference of the predetermined engine-start rotational speed from the resonance rotational speed is increased by the changed ratio value of the drive-power distribution ratio.

In the four-wheel drive vehicle according to the first aspect of the invention, the target engine rotational speed in the engine automatic-start control is changed, based on the drive-power distribution ratio, from the predetermined engine-start rotational speed to the changed engine rotational speed, such that the difference of the changed engine rotational speed from the resonance rotational speed that causes the resonance of the drive system is larger than the difference of the predetermined engine-start rotational speed from the resonance rotational speed, whereby occurrence of the resonance of the drive system due to torque fluctuation of the engine is suppressed or avoided upon execution of the engine automatic-start control. Therefore, when the engine automatic-start control is executed, it is possible to suppress or prevent increase of the NV due to increase of vibration of the drive system.

In the four-wheel drive vehicle according to the second aspect of the invention, the target engine rotational speed is set to the changed engine rotational speed that is different, by the predetermined speed value, from the resonance rotational speed that is calculated based on the drive-power distribution ratio, so that the occurrence of the resonance of the drive system due to the torque fluctuation of the engine is appropriately suppressed or avoided. Further, the predetermined speed value is a predetermined value for setting the changed engine rotational speed as the target engine rotational speed, which makes it possible to avoid or suppress the occurrence of resonance of the drive system and to suppress an amount of change of the target engine rotational speed from the predetermined engine-start rotational speed to the changed engine rotational speed, so that, upon execution of the engine automatic-start control, the occurrence of the resonance of the drive system is appropriately suppressed or avoided with the amount of change of the target engine rotational speed from the predetermined engine-start rotational speed being suppressed.

In the four-wheel drive vehicle according to the third aspect of the invention, the predetermined engine-start rotational speed is an optimum speed value of the engine rotational speed, which maximizes an energy efficiency in the four-wheel drive vehicle. With the target engine rotational speed being changed from the an optimum speed value of the engine rotational speed to the changed engine rotational speed, the difference of the target engine rotational speed from the resonance rotational speed of the drive system is increased, so that increase of the NV can be suppressed or prevented while reduction of the energy efficiency can be suppressed. Further, where the target engine rotational speed is set to the changed engine rotational speed that is different, by the predetermined speed value, from the resonance rotational speed, the amount of change of the target engine rotational speed from the optimum speed value of the engine rotational speed is suppressed whereby the reduction of the energy efficiency is appropriately suppressed.

In the four-wheel drive vehicle according to the fourth aspect of the invention, when the engine automatic-start control is executed, a selected one of the change of the target engine rotational speed and the change of the drive-power distribution ratio is executed whereby the difference of the target engine rotational speed from the resonance rotational speed of the drive system is increased. Thus, the increase of the NV is suppressed or prevented with affection to a vehicle motion controllability being suppressed and with the amount of change of the target engine rotational speed from the predetermined engine-start rotational speed being suppressed. Where the predetermined engine-start rotational speed is the optimum speed value of the engine rotational speed, the reduction of the energy efficiency is suppressed.

In the four-wheel drive vehicle according to the fifth aspect of the invention, when the accelerating operation amount or the requested drive amount is not smaller than the threshold value, the target engine rotational speed is changed such that the difference of the changed engine rotational speed from the resonance rotational speed is larger than the difference of the predetermined engine-start rotational speed from the resonance rotational speed. Thus, in a situation with sudden start operation or sudden acceleration operation, a higher priority is given to the vehicle motion controllability by the drive-power distribution control rather than to improvement of the energy efficiency. On the other hand, when the accelerating operation amount or the requested drive amount is smaller than the threshold value, the drive-power distribution ratio is changed whereby the difference of the target engine rotational speed from the resonance rotational speed of the drive system is increased. Thus, in a situation with slow start operation or slow acceleration operation, a higher priority is given to the improvement of the energy efficiency rather than to the vehicle motion controllability by the drive-power distribution control. Therefore, the increase of the NV is suppressed or prevented with affection to the vehicle motion controllability being suppressed and with the amount of change of the target engine rotational speed from the predetermined engine-start rotational speed being suppressed. Where the predetermined engine-start rotational speed is the optimum speed value of the engine rotational speed, the reduction of the energy efficiency is suppressed.

In the four-wheel drive vehicle according to the sixth aspect of the invention, when the yaw rate is not smaller than the threshold value, the target engine rotational speed is changed such that the difference of the changed engine rotational speed from the resonance rotational speed is larger than the difference of the predetermined engine-start rotational speed from the resonance rotational speed. Thus, in a situation with large change of an attitude of the vehicle, a higher priority is given to the vehicle motion controllability by the drive-power distribution control rather than to improvement of the energy efficiency. On the other hand, when the yaw rate is smaller than the threshold value, the drive-power distribution ratio is changed whereby the difference of the target engine rotational speed from the resonance rotational speed of the drive system is increased. Thus, in a situation with small change of the attitude of the vehicle, a higher priority is given to the improvement of the energy efficiency rather than to the vehicle motion controllability by the drive-power distribution control. Therefore, the increase of the NV is suppressed or prevented with affection to the vehicle motion controllability being suppressed and with the amount of change of the target engine rotational speed from the predetermined engine-start rotational speed being suppressed. Where the predetermined engine-start rotational speed is the optimum speed value of the engine rotational speed, the reduction of the energy efficiency is suppressed.

In the four-wheel drive vehicle according to the seventh aspect of the invention, when the steering angle is not smaller than the threshold value, the target engine rotational speed is changed such that the difference of the changed engine rotational speed from the resonance rotational speed is larger than the difference of the predetermined engine-start rotational speed from the resonance rotational speed. Thus, in a situation with large change of the attitude of the vehicle, a higher priority is given to the vehicle motion controllability by the drive-power distribution control rather than to improvement of the energy efficiency. On the other hand, when the steering angle is smaller than the threshold value, the drive-power distribution ratio is changed whereby the difference of the target engine rotational speed from the resonance rotational speed of the drive system is increased. Thus, in a situation with small change of the attitude of the vehicle, a higher priority is given to the improvement of the energy efficiency rather than to the vehicle motion controllability by the drive-power distribution control. Therefore, the increase of the NV is suppressed or prevented with affection to the vehicle motion controllability being suppressed and with the amount of change of the target engine rotational speed from the predetermined engine-start rotational speed being suppressed. Where the predetermined engine-start rotational speed is the optimum speed value of the engine rotational speed, the reduction of the energy efficiency is suppressed.

In the four-wheel drive vehicle according to the eighth aspect of the invention, when the four-wheel drive vehicle is turning, the target engine rotational speed is changed such that the difference of the changed engine rotational speed from the resonance rotational speed is larger than the difference of the predetermined engine-start rotational speed from the resonance rotational speed. Thus, in a situation with large change of the attitude of the vehicle, a higher priority is given to the vehicle motion controllability by the drive-power distribution control rather than to improvement of the energy efficiency. On the other hand, when the when the four-wheel drive vehicle is running straight, the drive-power distribution ratio is changed whereby the difference of the target engine rotational speed from the resonance rotational speed of the drive system is increased. Thus, in a situation with small change of the attitude of the vehicle, a higher priority is given to the improvement of the energy efficiency rather than to the vehicle motion controllability by the drive-power distribution control. Therefore, the increase of the NV is suppressed or prevented with affection to the vehicle motion controllability being suppressed and with the amount of change of the target engine rotational speed from the predetermined engine-start rotational speed being suppressed. Where the predetermined engine-start rotational speed is the optimum speed value of the engine rotational speed, the reduction of the energy efficiency is suppressed.

BRIEF DESCRIPTION OF TUE DRAWINGS

FIG. 3 is a table indicating a relationship between each gear position of a mechanically-operated step-variable transmission portion (shown in FIG. 2) and a combination of engagement devices of the step-variable transmission portion, which are placed in engaged states to establish the gear position in the step-variable transmission portion;

Figure 10:
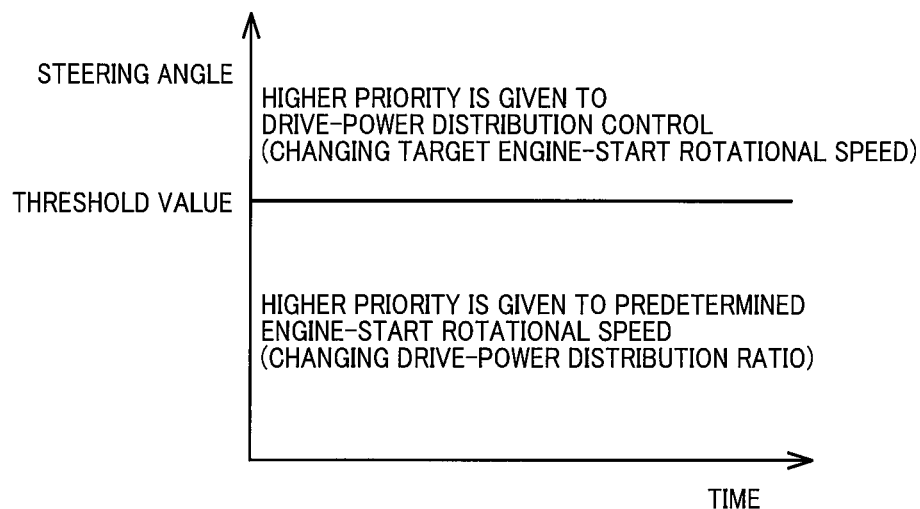
Figure 11:
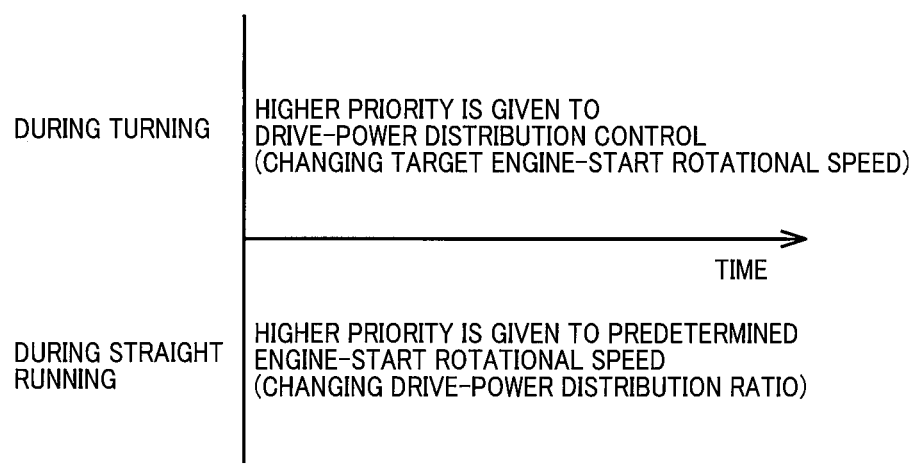

FIG. 10 is a view for explaining an example of a case in which one of the target engine rotational speed and the rear-wheel-side drive-power distribution ratio, which is selected depending on a steering angle, is changed upon execution of the engine automatic-start control; and FIG. 11 is a view for explaining an example of a case in which one of the target engine rotational speed and the rear-wheel-side drive-power distribution ratio, which is selected depending on whether the vehicle is running straight or is turning, is changed upon execution of the engine automatic-start control.

DETAILED DESCRIPTION OF PREFERRED EMBODIMENTS

Hereinafter, preferred embodiments of the invention will be described in detail with reference to the accompanying drawings.

First Embodiment

Figure 1:
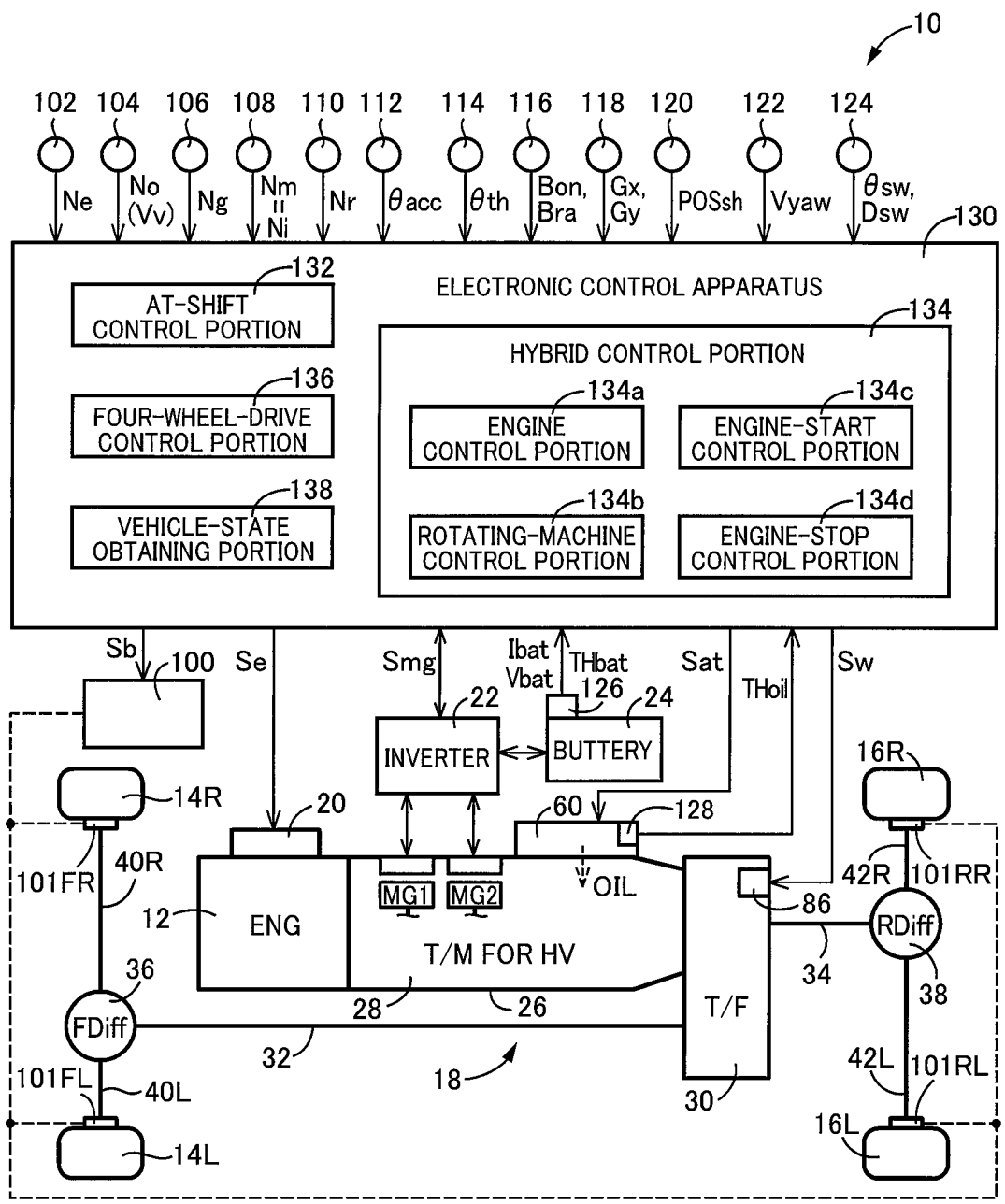
FIG. 1 is a view schematically showing a construction of a four-wheel drive vehicle to which the present invention is applied, for explaining major portions of control functions and control systems that are provided to perform various control operations in the four-wheel drive vehicle.

FIG. 1 is a view schematically showing a construction of a four-wheel drive vehicle 10 to which the present invention is applied, for explaining major portions of control functions and control systems that are provided to perform various control operations in the vehicle 10. As shown in FIG. 1, the vehicle 10 is a hybrid vehicle including drive power sources in the form of an engine 12 (see "ENG" in FIG. 1), a first rotating machine MG1 and a second rotating machine MG2. Thus, the vehicle 10 includes at least one drive power source including the engine 12. The vehicle 10 further includes right and left front wheels 14R, 14L, right and left rear wheels 16R, 16L and a power transmission apparatus 18 that is configured to transmit a drive power of the engine 12 to the right and left front wheels 14R, 14L and the right and left rear wheels 16R, 16L. The rear wheels 16R, 16L are main drive wheels that serve as drive wheels during a four-wheel drive running of the vehicle 10 but also during a two-wheel drive running of the vehicle 10. The front wheels 14R, 14L are auxiliary drive wheels that serve as driven wheels during the two-wheel drive running and serve as the drive wheel during the four-wheel drive running. The vehicle 10 is a four-wheel drive vehicle based on a vehicle of FR (front engine and rear drive) system. In the following description, the front wheels 14R, 14L will be referred to as "front wheels 14" and the rear wheels 16R, 16L will be referred to as "rear wheels 16", unless they are to be distinguished from each other. Further, the engine 12, first rotating machine MG1 and second rotating machine MG2 will be referred to as "drive power source PU", unless they are to be distinguished from one another.

The engine 12 is one of the drive power sources for driving the four-wheel drive vehicle 10 to run, and is a known internal combustion engine such as gasoline engine and diesel engine. The vehicle 10 is provided with an engine control device 20 that includes a throttle actuator, a fuel injection device and an ignition device. With the engine control device 20 being controlled by an electronic control apparatus 130 that is described below, an engine torque Te, which is an output torque of the engine 12, is controlled.

Each of the first and second rotating machines MG1, MG2 is a rotating electric machine having a function serving as an electric motor and a function serving as a generator. That is, each of the first and second rotating machines MG1, MG2 is a so-called "motor generator". Each of the first and second rotating machines MG1, MG2 is a rotating machine that can serve as the drive power source for driving the four-wheel drive vehicle 10 to run. The first and second rotating machines MG1, MG2 are connected to a battery 24 provided in the vehicle 10, through an inverter 22 provided in the vehicle 10. The inverter 22 is controlled by the electronic control apparatus 130 whereby an MG1 torque Tg and an MG2 torque Tm as output torques of the respective first and second rotating machines MG1, MG2 are controlled. The output torque of each of the first and second rotating machines MG1, MG2 serves as a power running torque when acting as a positive torque for acceleration of the vehicle 10, with the each of the first and second rotating machines MG1, MG2 being rotated in a forward direction. The output torque of each of the first and second rotating machines MG1, MG2 serves as a regenerative torque when acting as a negative torque for deceleration of the vehicle 10, with the each of the first and second rotating machines MG1, MG2 being rotated in the forward direction. The battery 24 is the electric storage device to and from which an electric power is supplied from and to the first rotating machine MG1 and the second rotating machine MG2. The output torque of each of the first and second rotating machines MG1, MG2 serves as a power running torque when acting as a positive torque for acceleration of the vehicle 10, with the each of the first and second rotating machines MG1, MG2 being rotated in a forward direction. The output torque of each of the first and second rotating machines MG1, MG2 serves as a regenerative torque when acting as a negative torque for deceleration of the vehicle 10, with the each of the first and second rotating machines MG1, MG2 being rotated in the forward direction. The battery 24 is an electric storage device to and from which an electric power is supplied from and to the first rotating machine MG1 and the second rotating machine MG2. The first and second rotating machines MG1, MG2 are disposed inside a casing 26 as a non-rotary member that is attached to a body of the vehicle 10.

The power transmission apparatus 18 includes an automatic transmission 28 (see "T/M FOR HV" in FIG. 1) that is a transmission for hybrid system, a transfer 30 (see "T/F" in FIG. 1), a front propeller shaft 32, a rear propeller shaft 34, a front-wheel-side differential gear device 36 (see "FDiff" in FIG. 1), a rear-wheel-side differential gear device 38 (see "RDiff" in FIG. 1), right and left front axles 40R, 40L and right and left rear axles 42R, 42L, so that the drive power of the engine 12, example, is to be transmitted to the rear wheels 16R, 16L sequentially through the transfer 30, rear propeller shaft 34, rear-wheel-side differential gear device 38 and right and left rear axles 42R, 42L, for example. When a part of the drive power transmitted to the transfer 30 from the engine 12 is distributed toward the front wheels 14R, 14L in the power transmission apparatus 18, the distributed part of the drive power is transmitted to the front wheels 14R, 14L sequentially through the front propeller shaft 32, front-wheel-side differential gear device 36 and right and left front axles 40R, 40L, for example.

Figure 2:
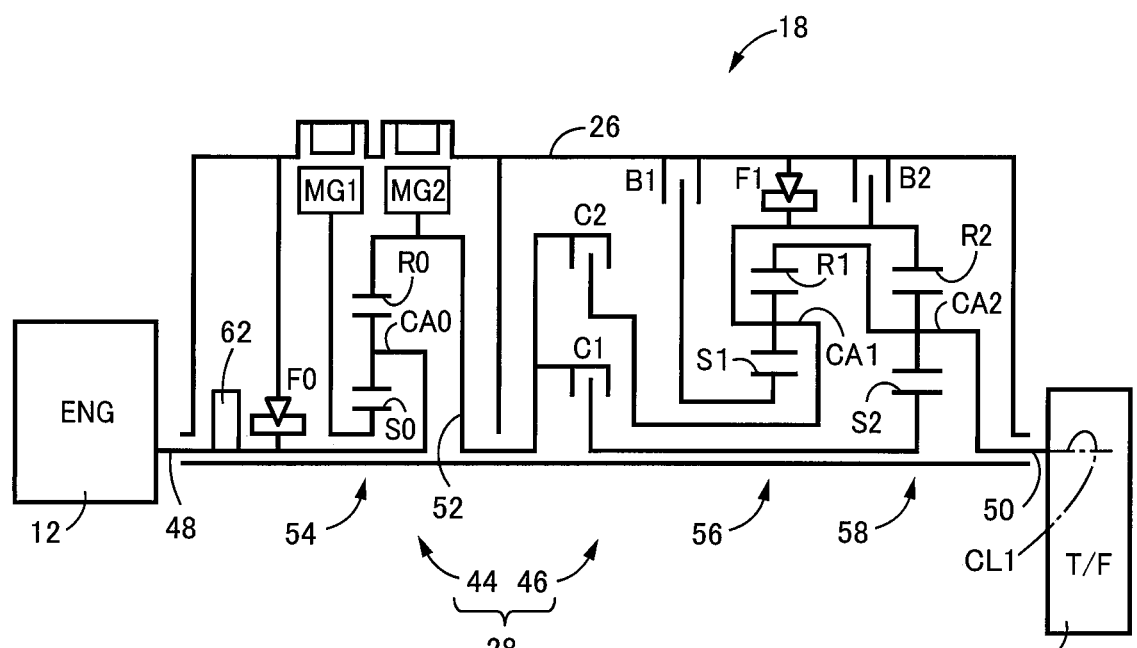
FIG. 2 is a view schematically showing a construction of an automatic transmission shown in FIG. 1.

FIG. 2 is a view schematically showing a construction of the automatic transmission 28. As shown in FIG. 2, the automatic transmission 28 includes an electrically-operated continuously-variable transmission portion 44 and a mechanically-operated step-variable transmission portion 46 that are disposed in series on a rotary axis CL1 that are common to the transmission portions 44, 46 within the casing 26. The electrically-operated continuously-variable transmission portion 44 is connected to the engine 12 directly or indirectly through, for example, a damper (not shown). The mechanically-operated step-variable transmission portion 46 is connected to an output rotary member of the electrically-operated continuously-variable transmission portion 44. The transfer 30 is connected to an output rotary member of the mechanically-operated step-variable transmission portion 46. In the automatic transmission 28, the drive power outputted from the engine 12 or the second rotating machine MG2, for example, is transmitted to the mechanically-operated step-variable transmission portion 46, and is then transmitted from the mechanically-operated step-variable transmission portion 46 to the transfer 30. In the following description, the electrically-operated continuously-variable transmission portion 44 and the mechanically-operated step-variable transmission portion 46 will be referred simply to as "continuously-variable transmission portion 44" and "step-variable transmission portion 46", respectively. The power corresponds to a torque and a force unless they are to be distinguished from one another. Each of the continuously-variable transmission portion 44 and the step-variable transmission portion 46 is constructed substantially symmetrically about the rotary axis CL1, so that a lower half of each of the transmission portions 44, 46 is not shown in FIG. 2. The rotary axis CL1 corresponds to an axis of a crank shaft of the engine 12, an axis of a connection shaft 48 which is an input rotary member of the automatic transmission 28 and which is connected to the crank shaft of the engine 12, and an axis of an output shaft 50 which is an output rotary member of the automatic transmission 28. The connection shaft 48 serves also as an input rotary member of the continuously-variable transmission portion 44. The output shaft 50 serves also as an output rotary member of the step-variable transmission portion 46.

The continuously-variable transmission portion 44 is provided with: the above-described first rotating machine MG1; and a differential mechanism 54 serving as a drive-power distribution mechanism to mechanically distribute the power of the engine 12 to the first rotating machine MG1 and to an intermediate transmission member 52 that is an output rotary member of the continuously-variable transmission portion 44. The above-described second rotating machine is MG2 connected to the intermediate transmission member 52 in a power transmittable manner. The continuously-variable transmission portion 44 is an electrically-operated continuously-variable transmission wherein a differential state of the differential mechanism 54 is controllable by controlling an operation state of the first rotating machine MG1. The continuously-variable transmission portion 44 is operated as the electrically-operated continuously-variable transmission whose gear ratio (may be referred also to as "speed ratio") $\gamma 0$ (=engine rotational speed Ne/MG2 rotational speed Nm) is to be changed. The engine rotational speed Ne is a rotational speed of the engine 12, and is equal to an input rotational speed of the continuously-variable transmission portion 44, i.e., a rotational speed of the connection shaft 48. The engine rotational speed Ne is also an input rotational speed of the automatic transmission 28 that is constituted mainly by the continuously-variable transmission portion 44 and the step-variable transmission portion 46. The MG2 rotational speed Nm is a rotational speed of the second rotating machine MG; and is equal to an output rotational speed of the continuously-variable transmission portion 44, i.e., a rotational speed of the intermediate transmission member 52. The first rotating machine MG1 is a rotating machine capable of controlling the engine rotational speed Ne. It is noted that controlling an operation state of the first rotating machine MG1 is controlling the operation of the first rotating machine MG1.

The differential mechanism 54 is a planetary gear device of a single-pinion type having a sun gear S0, a carrier CA0 and a ring gear R0. The carrier CA0 is connected to the engine 12 through the connection shaft 48 in a drive-power transmittable manner, and the sun gear S0 is connected to the first rotating machine MG1 in a drive-power transmittable manner, and the ring gear R0 is connected to the second rotating machine MG2 in a drive-power transmittable manner. In the differential mechanism 54, the carrier CA0 serves as an input element, the sun gear S0 serves as a reaction element, and the ring gear R0 serves as an output element.

The step-variable transmission portion 46 is a step-variable transmission that constitutes a power transmission path between the intermediate transmission member 52 and the transfer 30. The intermediate transmission member 52 also serves as an input rotary member of the step-variable transmission portion 46. The second rotating machine MG2 is connected to the intermediate transmission member 52, so as to be rotated integrally with the intermediate transmission member 52. The step-variable transmission portion 46 is an automatic transmission that constitutes a part of a power transmission path between the drive power source PU (for driving the vehicle 10 to run) and the drive wheels (front and rear wheels 14, 16). The step-variable transmission portion 46 is a known automatic transmission of a planetary gear type provided with a plurality of planetary gear devices including first and second planetary gear devices 56, 58 and a plurality of engagement devices including a one-way clutch F1, a clutch C1, a clutch C2, a brake B1 and a brake B2. Hereinafter, the clutch C1, clutch C2, brake B1 and brake B2 will be referred to as "engagement devices CB" unless they are to be distinguished from one another.

Each of the engagement devices CB is a hydraulically-operated frictional engagement device constituted by, for example, a wet-type multiple-disc clutch including a plurality of friction plates which are superposed on each other and which are forced against each other by a hydraulic actuator, or a band brake including a rotary drum and one band or two bands which is/are wound on an outer circumferential surface of the rotary drum and tightened a hydraulic actuator. Each of the engagement devices CB receives a regulated hydraulic pressure supplied from a hydraulic control unit (hydraulic control circuit) 60 (see FIG. 1) that is provided in the four-wheel drive vehicle 10, whereby its operation state is switched between an engaged state and a released state, for example.

In the step-variable transmission portion 46, selected ones of rotary elements of the first and second planetary gear devices 56, 58 are connected to each other or to the intermediate transmitting member 52, casing 26 or output shaft 50, either directly or indirectly through the engagement devices CB or the one-way clutch F1. The rotary elements of the first planetary gear device 56 are a sun gear S1, a carrier CA1 and a ring gear R1. The rotary elements of the second planetary gear device 58 are a sun gear S2, a carrier CA2 and a ring gear R2.

The step-variable transmission portion 46 is shifted to a selected one of a plurality of gear positions (speed positions) by engaging actions of selected ones of the engagement devices CB. The plurality of AT gear positions have respective different gear ratios (speed ratios) $\gamma at$ (=AT input rotational speed Ni/output rotational speed No). Namely, the step-variable transmission portion 46 is shifted up and down from one gear position to another by placing selected ones of the engagement devices in the engaged state. The step-variable transmission portion 46 is a step-variable automatic transmission configured to establish a selected one of the plurality of gear positions. In the following description of the present embodiment, the gear position established in the step-variable transmission portion 46 will be referred to as AT gear position. The AT input rotational speed Ni is an input rotational speed of the step-variable transmission portion 46 that is a rotational speed of the input rotary member of the step-variable transmission portion 46, which is equal to a rotational speed of the intermediate transmission member 52, and which is equal to the MG2 rotational speed Nm. Thus, the AT input rotational speed Ni can be represented by the MG2 rotational speed Nm. The output rotational speed No is a rotational speed of the output shaft 50 that is an output rotational speed of the step-variable transmission portion 46, which is considered to be an output rotational speed of the automatic transmission 28.

As shown in a table of FIG. 3, the step-variable transmission portion 46 is configured to establish a selected one of a plurality of AT gear positions in the form of four forward AT gear positions and a reverse AT gear position. The four forward AT gear positions consist of a first speed AT gear position, a second speed AT gear position, a third speed AT gear position and a fourth speed AT gear position, which are represented by "1st", "2nd", "3rd" and "4th" in the table of FIG. 3. The first speed AT gear position is the lowest-speed gear position having a highest gear ratio γat, while the fourth speed AT gear position is the highest-speed gear position having a lowest gear ratio γat. The reverse AT gear position is represented by "Rev" in the table of FIG. 3, and is established by, for example, engagements of the clutch C1 and the brake B2. That is, when the vehicle 10 is to run in reverse direction, the first speed AT gear position is established, for example. The table of FIG. 3 indicates a relationship between each of the AT gear positions of the step-variable transmission portion 46 and operation states of the respective engagement devices CB of the step-variable transmission portion 46, namely, a relationship between each of the AT gear positions and a combination of ones of the engagement devices CB, which are to be placed in theirs engaged states to establish the each of the AT gear positions. In the table of FIG. 3, "O" indicates the engaged state of the engagement devices CB, "Δ" indicates the engaged state of the brake B2 during application of an engine brake to the vehicle 10 or during a coasting shift-down action of the step-variable transmission portion 46, and the blank indicates the released state of the engagement devices CB.

The step-variable transmission portion 46 is configured to switch from one of the AT gear positions to another one of the AT gear positions, namely, to establish one of the AT gear positions which is selected, by the electronic control apparatus 130, according to, for example, an acceleration operation made by a vehicle driver (operator) and the vehicle running speed Vv. The step-variable transmission portion 46 is shifted up or down from one of the AT gear positions to another, for example, by so-called "clutch-to-clutch" shifting operation that is made by releasing and engaging actions of selected two of the engagement devices CB, namely, by a releasing action of one of the engagement devices CB and an engaging action of another one of the engagement devices CB.

The four-wheel drive vehicle 10 further includes an MOP 62 that is a mechanically-operated oil pump, and an electrically-operated oil pump (not shown).

The above-described one-way clutch F0 is a locking mechanism by which the carrier CA0 can be fixed to be unrotatable. That is, the one-way clutch F0 is the lock mechanism capable of fixing the connection shaft 48 (which is connected to the crank shaft of the engine 12 and is to be rotated integrally with the carrier CA0) relative to the casing 26. The one-way clutch F0 includes two members that are rotatable relative to each other, wherein one of the two members is connected integrally to the connection shaft 48, and the other member is connected integrally to the casing 26. The other member of the one-way clutch F0 is to be rotated in a positive direction (that corresponds to a direction of rotation of the engine 12 during operation of the engine 12), with the one-way clutch F0 being in its released state. However, the other member of the one-way clutch F0 is not rotatable in a negative direction (that is opposite to the above-describe positive direction), with the one-way clutch F0 being automatically placed in its engaged. Thus, the engine 12 is rotatable relative to the casing 26 when the one-way clutch F0 is in the released state, and is unrotatable relative to the casing 26 when the one-way clutch F0 is the engaged state. That is, the engine 12 is fixed to the casing 26 by the engagement of the one-way clutch F0. Thus, the one-way clutch F0 allows the carrier CA0 to be rotated in the above-described positive direction corresponding to the direction of rotation of the engine 12, and inhibits the carrier CA0 from being rotated in the above-described negative direction. That is, the one-way clutch F0 is the locking mechanism which allows rotation of the engine 12 in the positive direction and which inhibits rotation of the engine 12 in the negative direction.

The MOP 62 is connected to the connection shaft 48 so as to be rotated together with rotation the engine 12 and to discharge a working fluid OIL that is be used in the power transmission apparatus 18. Further, the electrically-operated oil pump (not shown) is operated, for example, when the engine 12 is stopped, namely, when the MOP 62 is not operated. The working fluid OIL discharged from the MOP 62 and the electrically-operated oil pump is supplied to the hydraulic control unit 60. The working fluid OIL is regulated by the hydraulic control unit 60, and the regulated hydraulic pressure is supplied to each of the engagement devices CB of the power transmission apparatus 18 (see FIG. 1).

Figure 4:
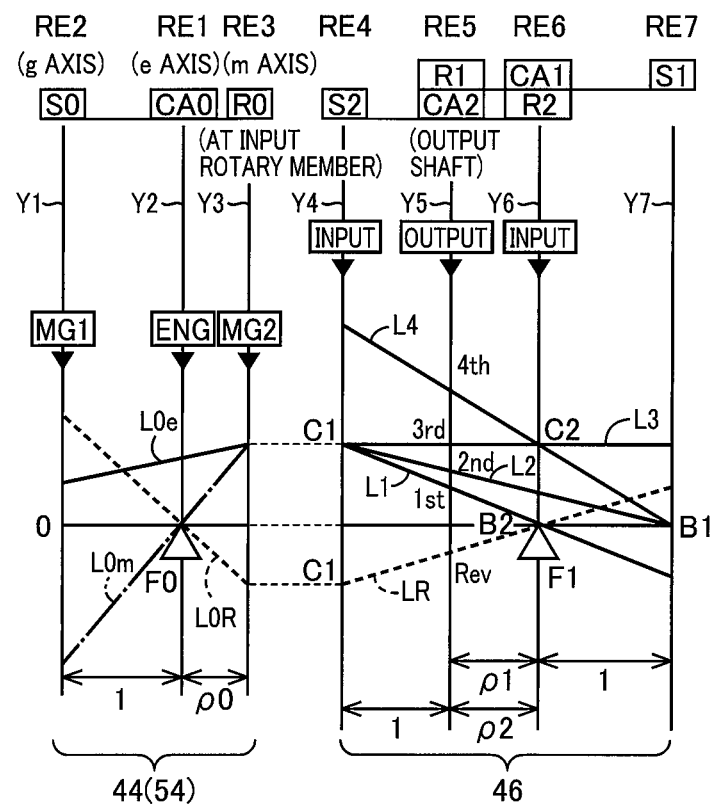
FIG. 4 is a collinear chart indicating a relationship among rotational speeds of rotary elements of an electrically-operated continuously-variable transmission portion (shown in FIG. 2) and the mechanically-operated step-variable transmission portion.

FIG. 4 is a collinear chart indicating a relationship among rotational speeds of the rotary elements of the continuously-variable transmission portion 44 and the step-variable transmission portion 46. In FIG. 4, three vertical lines Y1, Y2, Y3 corresponding to the three rotary elements of the differential mechanism 54 constituting the continuously variable transmission portion 44 are a g-axis representing the rotational speed of the sun gear S0 corresponding to a second rotary element RE2, an e-axis representing the rotational speed of the carrier CA0 corresponding to a first rotary element RE1, and an in-axis representing the rotational speed of the ring gear R0 corresponding to a third rotary element RE3 (i.e., the input rotational speed of the step-variable transmission portion 46) in order from the left side to the right. Four vertical lines Y4, Y5, Y6, Y7 of the step-variable transmission portion 46 are axes representing a rotational speed of the sun gear S2 corresponding to a fourth rotary element RE4, a rotational speed of the ring gear R1 and the carrier CA2 connected to each other and corresponding to a fifth rotary element RE5 (i.e., the rotational speed of the output shaft 50), a rotational speed of the carrier CA1 and the ring gear R2 connected to each other and corresponding to a sixth rotary element RE6, and a rotational speed of the sun gear S1 corresponding to a seventh rotary element RE7, respectively, in order from the left side to the right. An interval between the vertical lines Y1, Y2, Y3 is determined in accordance with a gear ratio ρ0 of the differential mechanism 54. An interval between the vertical lines Y4, Y5, Y6, Y7 is determined in accordance with gear ratios ρ1, ρ2 of the first and second planetary gear devices 56, 58. Where an interval between the sun gear and the carrier is set to an interval corresponding to "1" in the relationship between the vertical axes of the collinear chart, an interval between the carrier and the ring gear is set to an interval corresponding to the gear ratio ρ (=number of teeth of the sun gear/number of teeth of the ring gear) of the planetary gear device.

As shown in the collinear chart of FIG. 4, in the differential mechanism 54 of the continuously-variable transmission portion 44, the engine 12 (see "ENG" in FIG. 4) is connected to the first rotary element RE1, the first rotating machine MG1 (see "MG1" in FIG. 4) is connected to the second rotary element RE2, and the second rotating machine MG2 (see "MG2" in FIG. 4) is connected to the third rotary element RE3 that is to be rotated integrally with the intermediate transmission member 52, such that rotation of the engine 12 is to be transmitted to the step-variable transmission portion 46 through the intermediate transmission member 52. The relationship between the rational speeds of the sun gear S0 and the ring gear R0 in the continuously-variable transmission portion 44 is represented by straight lines LOe, LOm, L0R that pass through the vertical line Y2.

In the step-variable transmission portion 46, the fourth rotary element RE4 is selectively connected to the intermediate transmission member 52 through the clutch C1, the fifth rotary element RE5 is connected to the output shaft 50, the sixth rotary element RE6 is selectively connected to the intermediate transmission member 52 through the clutch C2 and is selectively connected to the casing 26 through the brake B2, and the seventh rotary element RE7 is selectively connected to the casing 26 through the brake B1. In the step-variable transmission portion 46, the gear positions "1st", "2nd", "3rd", "4th", "Rev" are selectively established by engagement/release controls of the engagement devices CB, and the rotational speed of the output shaft 50 when each of the gear positions is established is indicated by an intersection of a corresponding one of straight lines L1, L2, L3, L4, LR with the vertical line Y5.

In FIG. 4, a straight line LOe and the straight lines L1, L2, L3, L4, which are represented by respective solid lines, indicate the relationship among the rotational speeds of the rotary elements in forward running of the vehicle 10 in HV running mode in which the vehicle 10 is enabled to perform hybrid running (=HV running) with at least the engine 12 being operated as the drive power source. In this hybrid running mode, when a reaction torque, i.e., a negative torque from the first rotating machine MG1, is inputted in positive rotation to the sun gear S0 with respect to the engine torque Te inputted to the carrier CA0 in the differential mechanism 54, an engine direct transmission torque Td [=Te/(1+ρ0)=−(1/ρ0)×Tg] appears in the ring gear R0 as a positive torque in positive rotation. A combined torque of the engine direct transmission torque Td and the MG2 torque Tm is transmitted as a drive torque of the vehicle 10 acting in the forward direction depending on a required drive power to the transfer 30 through the step-variable transmission portion 46 in which one of the AT first to fourth gear positions is established. The first rotating machine MG1 functions as the generator when generating a negative torque with its rotation in positive direction. An electric power Wg generated by the first rotating machine MG1 is stored in the battery 24 or consumed by the second rotating machine MG2. The second rotating machine MG2 outputs the MG2 torque Tm by using all or a part of the generated electric power Wg or using the electric power supplied from the battery 24 in addition to the generated electric power Wg.

In FIG. 4, a straight line LOm represented by one-dot chain line and the straight lines L1, L2, L3, L4 represented by the respective solid lines indicate the relationship among the rotational speeds of the rotary elements in forward running of the vehicle 10 in EV running mode in which the vehicle 10 is enabled to perform motor running (=EV running) with at least one of the first and second rotating machines MG1, MG2 being operated as the drive power source in a state in which the engine 12 is stopped. As the EV running in forward direction in the EV running mode, there are a one-motor-drive EV running and a two-motor-drive EV running, for example. In the one-motor-drive EV running, the vehicle 10 is caused to run with only the second rotating machine MG2 being operated as the drive power source. In the two-motor-drive EV running, the vehicle 10 is caused to run with both of the first and second rotating machines MG1, MG2 being operated as the drive power sources. In the one-motor-drive EV running, the carrier CA0 is not rotated, and the MG2 torque Tm acting as a positive torque is inputted to the ring gear R0 whereby the ring gear R0 is rotated in positive direction. In this instance, the first rotating machine MG1, which is connected to the sun gear S0, is placed in non-load state and is idled in negative direction. In the one-motor-drive EV running, the one-way clutch F0 is released so that the connection shaft 48 is not fixed to the casing 26.

In the two-motor-drive EV running, in a state in which the carrier CA0 is not rotated, when the MG1 torque Tg acting as a negative torque is inputted to the sun gear S0 whereby the sun gear S0 is rotated in negative direction, the one-way clutch F0 is automatically engaged so as to inhibit the carrier CA0 from being rotated in negative direction. While the carrier CA0 is fixed to be unrotatable by engagement of the one-way clutch F0, the MG1 torque Tg acts as a reaction torque on the ring gear R0. Further, in the two-motor-drive EV running, the MG2 torque Tm is inputted to the ring gear R0 as in the one-motor-drive EV running. In the state in which the carrier CA0 is not rotated, if the MG2 torque Tm is not inputted to the ring gear R0 when the MG1 torque Tg acting as the negative torque is inputted to the sun gear S0, the one-motor-drive EV running is performed with the MG1 torque Tg. In the forward running in the EV running mode, the engine rotational speed Ne is zeroed with the engine 12 being not operated, and the torque of at least one of the MG1 torque Tg and the MG2 torque Tm is transmitted, as a drive torque for driving the four-wheel drive vehicle 10 to run in forward direction, to the transfer 30 through the step-variable transmission portion 46 in which one of the AT first to fourth gear positions is established. In the forward running in the EV running mode, the MG1 torque Tg acts as a negative torque in negative direction and serves as a power running torque, while the MG2 torque Tm acts as a positive torque in positive direction and serves as a power running torque.

In FIG. 4, the straight lines L0R, LR represented by respective broken lines indicate the relationship among the rotational speeds of the rotary elements in reverse running of the four-wheel drive vehicle 10 in the EV running mode. In this reverse running in the EV running mode, the MG2 torque Tm acting as the negative torque in the negative direction is inputted to the ring gear R0, and is transmitted, as a drive torque for driving the vehicle 10 to run in reverse direction, to the transfer 30 through the step-variable transmission portion 46 in which the AT first gear position is established. In the vehicle 10, under controls executed by the electronic control apparatus 130, in a state in which the AT first gear position or other low-speed gear position among the plurality of AT gear positions is established, the MG2 torque Tm acting in the negative direction that is opposite to when the vehicle 10 runs in the forward direction, is outputted from the second rotating machine MG2 whereby the reverse running of the vehicle 10 can be performed. In the reverse running in the EV running mode, the MG2 torque Tm acts as a negative torque in the negative direction and serves as a power running torque. It is noted that, in the HV running mode, too, since the second rotating machine MG2 can be rotated in the negative direction as indicated by the straight line L0R, the reverse running of the vehicle 10 can be performed as in the EV running mode.

Figure 5:
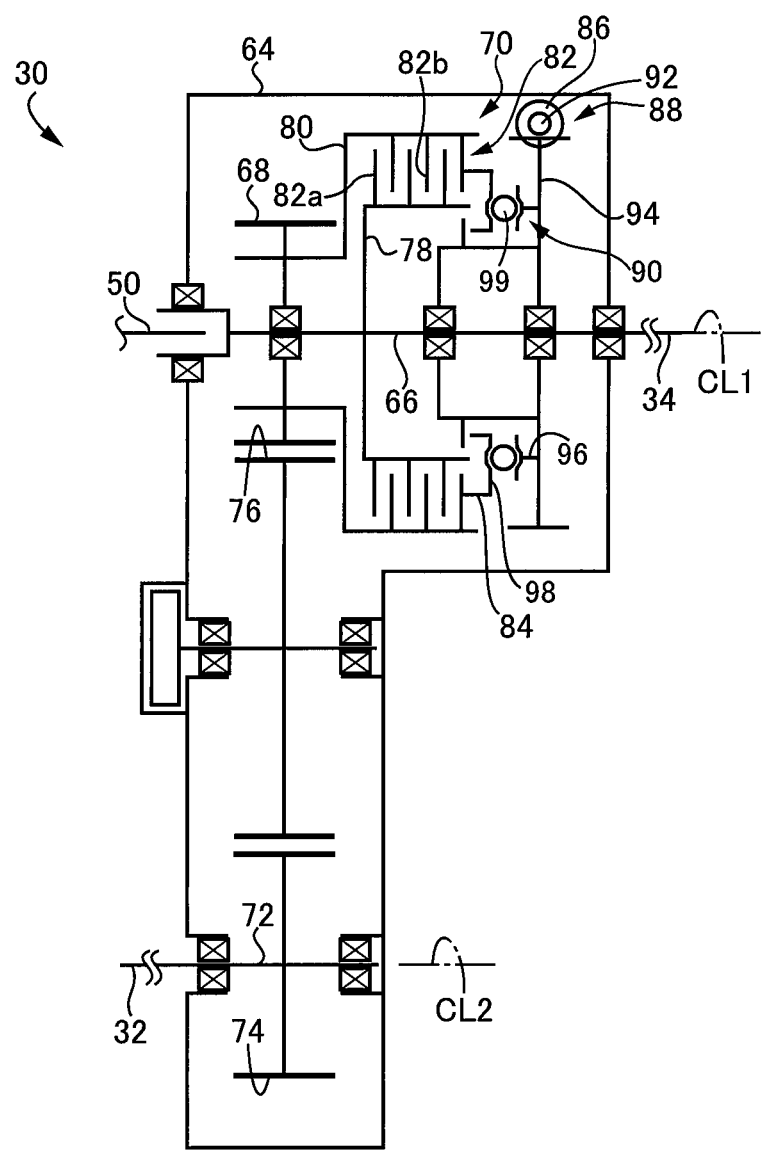
FIG. 5 is a view schematically showing a construction of a transfer shown in FIG. 1 and FIG. 2.

FIG. 5 is a view schematically showing a construction of the transfer 30. The transfer 30 includes a transfer casing 64 as a non-rotary member, a rear-wheel-side output shaft 66, a front-wheel driving gear 68 and a front-wheel drive clutch 70. The rear-wheel-side output shaft 66, front-wheel driving gear 68 and front-wheel drive clutch 70 are provided inside the transfer casing 64, and are disposed on a rotary axis CL1 that is common to the output shaft 66, driving gear 68 and drive clutch 70. The transfer 30 further includes a front-wheel-side output shaft 72, a front-wheel driven gear 74 and a front-wheel idler gear 76 that are provided inside the transfer casing 64, such that the front-wheel-side output shaft 72 and the front-wheel driven gear 74 are disposed on a rotary axis CL2 that is common to the output shaft 72 and driven gear 74. The rotary axis CL2 corresponds to axes of the front propeller shaft 32 and the front-wheel-side output shaft 72, for example.

The rear-wheel-side output shaft 66 is connected to the output shaft 50 in a power transmittable manner, and is connected to the rear propeller shaft 34 in a power transmittable manner, so that the drive power transmitted from the drive power source PU to the output shaft 50 though the automatic transmission 28 is to be outputted toward the rear wheels 16 by the rear-wheel-side output shaft 66. The output shaft 50 serves also as an input rotary member of the transfer 30, which is configured to input the drive power transmitted from the drive power source PU, to the rear-wheel-side output shaft 66 of the transfer 30, namely, serves as a drive-power transmission shaft configured to transmit the drive power transmitted from the drive power source PU, to the transfer 30. The automatic transmission 28 is an automatic transmission configured to transmit the drive power of the drive power source PU to the output shaft 50.

The front-wheel driving gear 68 is provided to be rotatable relative to the rear-wheel-side output shaft 66. The front-wheel drive clutch 70 is a multi-plate friction clutch configured to adjust a torque transmitted from the rear-wheel-side output shaft 66 to the front-wheel driving gear 68, namely, adjust a torque transmitted from the rear-wheel-side output shaft 66 to the front-wheel-side output shaft 72.

The front-wheel driven gear 74 is provided to be integral with the front-wheel-side output shaft 72, so as to be connected to the front-wheel-side output shaft 72 in a power transmittable manner. The front-wheel idler gear 76 is provided to mesh with the front-wheel driving gear 68 and the front-wheel driven gear 74, so as to connect between the front-wheel driving gear 68 and the front-wheel driven gear 74 in a power transmittable manner.

The front-wheel-side output shaft 72 is connected to the front-wheel driving gear 68 through the front-wheel driven gear 74 and the front-wheel idler gear 76 to the front-wheel driving gear 68 in a power transmittable manner, and is connected also to the front propeller shaft 32 in a power transmittable manner. The front-wheel-side output shaft 72 is configured to output a part of the drive power of the drive power source PU, which part is transmitted to the front-wheel driving gear 68 through the front-wheel drive clutch 70, so that the outputted part of the drive power is to be transmitted toward the front wheels 14.

The front-wheel drive clutch 70 includes a clutch hub 78, a clutch drum 80, a frictional engagement elements 82 and a piston 84. The clutch hub 78 is connected to the rear-wheel-side output shaft 66 in a power transmittable manner. The clutch drum 80 is connected to the front-wheel driving gear 68 in a power transmittable manner. The frictional engagement elements 82 include a plurality of first friction plates 82a and a plurality of second friction plates 82b. The first friction plates 82a are provided to be movable in the direction of the rotary axis CL1 relative to the clutch hub 78 and to be unrotatable relative to the clutch hub 78. The second friction plates 82b are provided to be movable in the direction of the rotary axis CL1 relative to the clutch drum 80 and to be unrotatable relative to the clutch drum 80. The first and second friction plates 82a, 82b are alternately arranged and supposed on each other in the direction of the rotary axis CL1. The piston 84 is provided to be movable in the direction of the rotary axis CL1, so as to be brought into contact with the frictional engagement elements 82 and press the first and second friction plates 82a, 82b, thereby adjusting a torque capacity of the front-wheel drive clutch 70. When the frictional engagement elements 82 are not pressed by the piston 84, the torque capacity of the front-wheel drive clutch 70 is zeroed whereby the front-wheel drive clutch 70 is released.

With the torque capacity of the front-wheel drive clutch 70 being adjusted, the transfer 30 distributes the drive power of the drive power source PU transmitted through the automatic transmission 28, toward the rear-wheel-side output shaft 66 and the front-wheel-side output shaft 72. When the front-wheel drive clutch 70 is in its released state, namely, when a power transmission path between the rear-wheel-side output shaft 66 and the front-wheel driving gear 68 is cut off, the drive power of the drive power source PU transmitted to the transfer 30 through the automatic transmission 28 is transmitted toward the rear wheels 16 through, for example, the rear propeller shaft 34. When the front-wheel drive clutch 70 is in its slip-engaged state or fully engaged state, namely, when the power transmission path between the rear-wheel-side output shaft 66 and the front-wheel driving gear 68 is not cut off, a part of the drive power of the drive power source PU transmitted to the transfer 30 is transmitted toward the front wheels 14 through, for example, the front propeller shaft 32, and the remainder of the drive power of the drive power source PU transmitted to the transfer 30 is transmitted toward the rear wheels 16 through, for example, the rear propeller shaft 34. The transfer 30 is a drive-power distribution device capable of transmitting the drive power of the drive power source PU toward the front wheels 14 and the rear wheels 16.

The transfer 30 includes an electric motor 86, a worm gear 88 and a cam mechanism 90 that cooperate with one another to constitute a device configured to operate the front-wheel drive clutch 70.

The worm gear 88 is a pair of gears consisting of a worm 92 integrally formed on a shaft of the electric motor 86 and a worm wheel 94 provided with teeth that mesh with the worm 92. The worm wheel 94 is provided to be rotatable about the rotary axis CL1, so as to be rotated about the rotary axis CL1 when the electric motor 86 is rotated.

The cam mechanism 90 is provided between the worm wheel 94 and the piston 84 of the front-wheel drive clutch 70. The cam mechanism 90 includes a first member 96 connected to the worm wheel 94, a second member 98 connected to the piston 84, and a plurality of balls 99 interposed between the first and second members 96, 98, and is a mechanism configured to convert a rotary motion of the electric motor 86 into a linear motion.

The plurality of balls 99 are arranged equi-angularly in a circumferential direction about the rotary axis CL1. Each of first and second members 96, 98 has a cam groove provided in its contact surface that is in contact with the balls 99. The cam groove provided in the contact surface of each of the first and second members 96, 98 has a shape by which the first and second members 96, 98 are moved away from each other in the direction of the rotary axis CL1 when the first and second members 96, 98 are rotated relative to each other. Therefore, when the first and second members 96, 98 are rotated relative to each other, the first and second members 96, 98 are moved away from each other in the direction of the rotary axis CL1 whereby the piston 84 connected to the second member 98 is caused to press the frictional engagement elements 82. When the worm wheel 94 is rotated by the electric motor 86, a rotary motion of the worm wheel 94 is converted by the cam mechanism 90 into a liner motion in the direction of the rotary axis CL1 that is transmitted to the piston 84, and the frictional engagement elements 82 are pressed by the piston 84. A pressing force by which the piston 84 presses the frictional engagement elements 82 is adjusted whereby the torque capacity of the front-wheel drive clutch 70 is adjusted. In the transfer 30, with the torque capacity of the front-wheel drive clutch 70 being adjusted, it is possible to adjust a drive-power distribution ratio Rx that is a ratio of distribution of the drive power of the drive power source PU, between the pair of front wheels 14 and the pair of rear wheels 16.

The drive-power distribution ratio Rx is, for example, a rear-wheel-side drive-power distribution ratio Xr that is a ratio of the drive power transmitted from the drive power source PU to the rear wheels 16, to all of the drive power transmitted from the drive power source PU to the rear and front wheels 16, 14. Alternatively, the drive-power distribution ratio Rx is, for example, a front-wheel-side drive-power distribution ratio Xf (=1−Xr) that is a ratio of the drive power transmitted from the drive power source PU to the front wheels 14, to all of the drive power transmitted from the drive power source PU to the rear and front wheels 16, 14. In the present embodiment in which the rear wheels 16 are the main drive wheels, the rear-wheel-side drive-power distribution ratio Xr, which is a ratio of the drive power transmitted to the main drive wheels, is used as the drive-power distribution ratio Rx.

When the piston 84 does not press the frictional engagement elements 82, the torque capacity of the front-wheel drive clutch 70 is zeroed. In this instance, the front-wheel drive clutch 70 is released whereby the rear-wheel-side drive-power distribution ratio Xr becomes 1.0. In other words, the drive-power distribution ratio Rx, which is the ratio of distribution of the drive power between the pair of front wheels 14 and the pair of rear wheels 16, i.e., (drive power transmitted to front wheels 14):(drive power transmitted to rear wheels 16), is 0:100 where 100 represents all of the drive power of the drive power source PU transmitted to the transfer 30. On the other hand, when the piston 84 presses the frictional engagement elements 82, the torque capacity of the front-wheel drive clutch 70 is made larger than 0, and the rear-wheel-side drive-power distribution ratio Xr is reduced with increase of the torque capacity of the front-wheel drive clutch 70. When the torque capacity of the front-wheel drive clutch 70 is maximized, namely, when the front-wheel drive clutch 70 is fully engaged, the rear-wheel-side drive-power distribution ratio Xr becomes 0.5, namely, the drive-power distribution ratio Rx becomes 50:50 that is an equilibrium state. Thus, the transfer 30 is capable of adjusting the rear-wheel-side drive-power distribution ratio Xr within a range from 1.0 to 0.5, namely, adjusting the drive-power distribution ratio Rx within a range from 0:100 to 50:50, by adjusting the torque capacity of the front-wheel drive clutch 70. That is, the transfer 30 is capable of selectively establishing its two-wheel drive state and four-wheel drive state, such that the drive power of the drive power source PU is transmitted only toward the rear wheels 16 when the two-wheel drive state is established, and such that the drive force of the drive power source PU is transmitted toward the rear and front wheels 16, 14 when the four-wheel drive state is established.

Referring back to FIG. 1, the four-wheel drive vehicle 10 is provided with a wheel brake device 100 which includes a brake master cylinder (not shown) and wheel brakes 101 that are provided for respective wheels 14, 16. The wheel brake device 100 is configured to apply braking forces generated by the respective wheel brakes 101, to the respective wheels 14, 16. The wheel brakes 101 consist of front brakes 101FR, 101FL provided for the respective front wheels 14R, 14L and rear brakes 101RR, 101RL provided for the respective rear wheels 16R, 16L. The wheel brake device 100 is configured to supply a brake hydraulic pressure to a wheel cylinder (not shown) provided in each of the wheel brakes 101, in accordance with, for example, an operation for depressing a brake pedal by the vehicle driver. In the wheel brake device 100, normally, the brake master cylinder is configured to generate a master-cylinder hydraulic pressure whose magnitude corresponds to a braking operation amount Bra, and the generated master-cylinder hydraulic pressure is supplied as the brake hydraulic pressure to the wheel cylinder. On the other hand, in the wheel brake device 100, for example, during execution of an ABS control, an anti-skid control or a vehicle-running-speed control, the brake hydraulic pressure required for execution of such a control is supplied to the wheel cylinder for enabling the wheel brakes 101 to generate the braking forces. The brake operation amount Bra is an operation amount of the brake pedal operated by the vehicle driver, which corresponds to a depressing force applied to the brake pedal. Thus, the wheel brake device 100 is capable of adjusting the braking forces generated by the wheel brakes 101 and applied to the wheels 14, 16.

Further, the four-wheel drive vehicle 10 is provided with the electronic control apparatus 130 as a controller that includes a control apparatus configured to control, for example, the drive power source PU and the transfer 30. FIG. 1 is a view showing an input/output system of the electronic control apparatus 130, and is a functional block diagram for explaining major control functions and control portions of the electronic control apparatus 130. For example, the electronic control apparatus 130 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 130 may be constituted by two or more control units exclusively assigned to perform different control operations such as an engine control operation and a shift control operation.

The electronic control apparatus 130 receives various input signals based on values detected by respective sensors provided in the four-wheel drive vehicle 10. Specifically, the electronic control apparatus 130 receives: an output signal of an engine speed sensor 102 indicative of an engine rotational speed Ne which is a rotational speed of the engine 12; an output signal of an output speed sensor 104 indicative of an output rotational speed No which corresponds to the running speed Vv of the vehicle 10; an output signal of a MG1 speed sensor 106 indicative of an MG1 rotational speed Ng which is a rotational speed of the first rotating machine MG1; an output signal of a MG2 speed sensor 108 indicative of an MG2 rotational speed Nm which is a rotational speed of the second rotating machine MG2 and which is equal to an AT input rotational speed Ni; an output signal of a wheel speed sensor 110 indicative of a wheel rotational speed Nr of each of the wheels 14, 16; an output signal of an accelerator-opening degree sensor 112 indicative of an accelerator opening degree θacc representing an amount of accelerating operation made by the vehicle driver; an output signal of a throttle-opening degree sensor 114 indicative of a throttle opening degree θth that is an opening degree of an electronic throttle valve; an output signal of a brake pedal sensor 116 indicative of a brake-ON signal Bon representing a state of depression of the brake pedal by the vehicle driver to operate the wheel brakes 101 and also a braking operation amount Bra representing an amount of depression of the brake pedal by the vehicle driver corresponding to the depressing force applied to the brake pedal; an output signal of a G senor 118 indicative of a longitudinal acceleration Gx and a lateral acceleration Gy of the vehicle 10; an output signal of a shift position sensor 120 indicative of an operation position POSsh of a shift lever provided in the vehicle 10; an output signal of a yaw rate sensor 122 indicative of a yaw rate Vyaw that is a rate of change of a vehicle rotational angle about a vertical axis passing through a center of gravity of the vehicle 10; an output signal of a steering sensor 124 indicative of a steering angle θsw and a steering direction Dsw of a steering wheel provided in the vehicle 10; an output signal of a battery sensor 126 indicative of a battery temperature THbat, a battery charging/discharging electric current That and a battery voltage Vbat of the battery 24; and an output signal of a fluid temperature sensor 128 indicative of a working fluid temperature THoil that is a temperature of the working fluid OIL.

The amount of accelerating operation made by the vehicle driver is, for example, an acceleration operation amount that is an amount of operation of an acceleration operating member such as an accelerator pedal, and corresponds to a required output amount that is an amount of output of the four-wheel drive vehicle 10 required by the vehicle driver. As the required output amount required by the vehicle driver, the throttle opening degree θth can be used in addition to or in place of the accelerator opening degree θacc, for example.

The electronic control apparatus 130 generates various command signals to the various devices provided in the four-wheel drive vehicle 10, such as: an engine control command signal Se that is to be supplied to the engine control device 20 for controlling the engine 12; a rotating-machine control command signal Smg that is to be supplied to the inverter 22 for controlling the first and second rotating machines MG1, MG2; a hydraulic-pressure control command signal Sat that is to be supplied to the hydraulic control unit 60 for controlling the operation states of the engagement devices CB; an electric-motor control command signal Sw that is to be supplied to the electric motor 86 for controlling the electric motor 86; and a brake control command signal Sb that is to be supplied to the wheel brake device 100 for controlling the braking forces generated by the wheel brakes 101.

For performing various control operations in the four-wheel drive vehicle 10, the electronic control apparatus 130 includes an AT-shift control means in the form of an AT-shift control portion 132, a hybrid control means in the form of a hybrid control portion 134 and a four-wheel-drive control means in the form of four-wheel-drive control portion 136.

Figure 6:
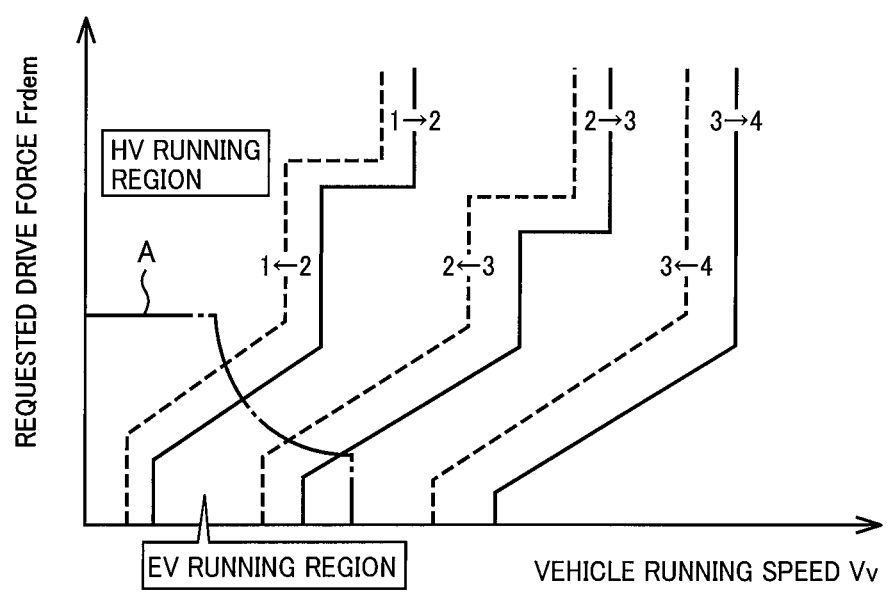
FIG. 6 is a view showing, by way of examples, an AT-gear-position shifting map used for controlling gear shifting in the step-variable transmission portion, a running-mode switching map used for switching a running mode, and a relationship between the AT-gear-position shifting map and the running-mode switching map.

The AT-shift control portion 132 is configured to determine whether a shifting action of the step-variable transmission portion 46 is to be executed, by using, for example, an AT gear position shift map as shown in FIG. 6, which is a relationship obtained by experimentation or determined by an appropriate design theory, and to output the hydraulic-pressure control command signal Sat supplied to the hydraulic control unit 60, so as to execute the shift control operation in the step-variable transmission portion 46 as needed. The AT gear position shifting map represents a predetermined relationship between two variables in the form of the vehicle running speed Vv and a required drive force Frdem, for example, which relationship is used to determine need of the shifting action of the step-variable transmission portion 46 and is represented by shifting lines in two-dimensional coordinates in which the running speed Vv and the required drive force Frdem are taken along respective two axes. It is noted that one of the two variables may be the output rotational speed No in place of the vehicle running speed Vv and that the other of the two variables may be a required drive torque Trdem, accelerator opening degree θacc or throttle valve opening degree θth in place of the required drive force Frdem. The shifting lines in the AT gear position shifting map consist of shift-up lines (indicated by solid lines in FIG. 6) for determining need of a shift-up action of the step-variable transmission portion 46, and shift-down lines (indicated by broken lines in FIG. 6) for determining need of a shift-down action of the step-variable transmission portion 46.

The hybrid control portion 134 has a function serving as an engine control means in the form of an engine control portion 134a for controlling the operation of the engine 12 and a function serving as a rotating-machine control means or a rotating-machine control portion 134b for controlling the operations of the first rotating machine MG1 and the second rotating machine MG2 via the inverter 22, and executes a hybrid drive control, for example, using the engine 12, the first rotating machine MG1 and the second rotating machine MG2 through these control functions.

The hybrid control portion 134 calculates a drive request amount in the form of the required drive force Frdem, by applying the accelerator opening degree θacc and the vehicle running speed Vv to, for example, a drive request amount map that represents a predetermined relationship. The required drive torque Trdem [Nm] applied to the drive wheels (front and rear wheels 14, 16), a required drive power Prdem [W] applied to the drive wheels, a required AT output torque applied to the output shaft 50, etc. can be used as the drive request amount, in addition to the required drive force Frdem [N]. The hybrid control portion 134 outputs the engine control command signal Se for controlling the engine 12 and the rotating-machine control command signal Sing for controlling the first and second rotating machines MG1, MG2, by taking account of a maximum chargeable amount Win of electric power that can be charged to the battery 24, and a maximum discharging amount Wout of electric power that can be discharged from the battery 24, such that the required drive power Prdem based on the required drive torque Trdem and the vehicle running speed Vv is obtained. The engine control command signal Se is, for example, a command value of an engine power Pe that is the power of the engine 12 outputting the engine torque Te at the current engine rotation speed Ne. The rotating-machine control command signal Sing is, for example, a command value of the generated electric power Wg of the first rotating machine MG1 outputting the MG1 torque Tg as the reaction torque of the engine torque Te at the MG1 rotation speed Ng which is the MG1 rotation speed Ng at the time of the command signal Sing output, and is a command value of a consumed electric power Wm of the second rotating machine MG2 outputting the MG2 torque Tm at the MG2 rotation speed Nm which is the MG2 rotation speed Nm at the time of the command signal Smg output.

The maximum chargeable amount Win of the battery 24 is a maximum amount of the electric power that can be charged to the battery 24, and indicates an input limit of the battery 24. The maximum dischargeable amount Wout of the battery 24 is a maximum amount of the electric power that can be discharged from the battery 24, and indicates an output limit of the battery 24. The maximum chargeable and dischargeable amounts Win, Wout are calculated by the electronic control apparatus 130, for example, based on a battery temperature THbat and a charged state value SOC [%] of the battery 24. The charged state value SOC of the battery 24 is a value indicative of a charged state of the battery 24, i.e., an amount of the electric power stored in the battery 24, and is calculated by the electronic control apparatus 130, for example, based on the charging/discharging electric current Ibat and the voltage Vbat of the battery 24.

For example, when the automatic transmission 28 is operated as a continuously variable transmission as a whole by operating the continuously variable transmission portion 44 as a continuously variable transmission, the hybrid control portion 134 controls the engine 12 and controls the generated electric power Wg of the first rotating machine MG1 so as to attain the engine rotational speed Ne and the engine torque Te at which the engine power Pe achieving the required drive power Prdem is acquired in consideration of an engine optimum fuel consumption point etc., and thereby provides the continuously variable shift control of the continuously variable transmission portion 44 to change the gear ratio γ0 of the continuously variable transmission portion 44. As a result of this control, the gear ratio γt (=γ0×γat=Ne/No) of the automatic transmission 28 is controlled in the case of operating the automatic transmission 28 as a continuously variable transmission. The above-described engine optimum fuel consumption point is predetermined as an optimum engine operation point, i.e., an engine operation point that maximizes a total fuel efficiency in the four-wheel drive vehicle 10 including not only a fuel efficiency of the engine 12 but also a charge/discharge efficiency of the battery 24, for example, when the required engine power Pedem is to be acquired. The engine operation point is an operation point of the engine 12 which is defined by a combination of the engine rotational speed Ne and the engine torque Te. The engine rotational speed Ne at the optimum engine operation point is an optimum engine rotational speed Neb that maximizes the energy efficiency in the vehicle 10.

For example, when the automatic transmission 28 is operated as a step-variable transmission as a whole by operating the continuously variable transmission portion 44 as in a step-variable transmission, the hybrid control portion 134 uses a predetermined relationship, for example, a step-variable gear position shift map, to determine need of a shifting action of the automatic transmission 28 and provides the shift control of the continuously variable transmission portion 44 so as to selectively establish the plurality of gear positions in coordination with the shift control of the AT gear position of the step-variable transmission portion 46 by the AT-shift control portion 132. The plurality of gear positions can be established by controlling the engine rotational speed Ne by the first rotating machine MG1 depending on the output rotational speed No so as to maintain the respective gear ratios γt.

The hybrid control portion 134 selectively establishes the motor running mode or the hybrid running mode as the running mode depending on a running state, so as to cause the vehicle 10 to run in a selected one of the running modes. For example, the hybrid control portion 134 establishes the EV running mode when the required drive power Prdem is in an EV running region smaller than a predetermined threshold value, and establishes the HV running mode when the required drive power Prdem is in an HV running region equal to or greater than the predetermined threshold value. In FIG. 6, one-dot chain line A is a boundary line between the HV running region and the EV running region, for switching between the HV running mode and the EV running mode. A predetermined relationship having the boundary line as indicated by the one-dot chain line A of FIG. 6 is an example of a running-mode switching map defined by the two-dimensional coordinates of variables in the form of the vehicle running speed Vv and the required drive force Frdem. It is noted that, in FIG. 6, the running-mode switching map is shown together with AT gear position shift map, for convenience of the description.

In the EV running mode, when the required drive power Prdem can be obtained only by the second rotating machine MG2, the hybrid control portion 134 causes the four-wheel drive vehicle 10 to run in the one-motor-drive EV running with only the second rotating machine MG2 being operated as the drive power source PU. On the other hand, when the required drive power Prdem cannot be obtained only by the second rotating machine MG2 in the EV running mode, the hybrid control portion 134 causes the vehicle 10 to run in the two-motor-drive EV running. However, even when the required drive power Prdem can be obtained only by the second rotating machine MG2, the vehicle 10 may be caused to run in the two-motor-drive EV running, if the use of both of the first rotating machine MG1 and second rotating machine MG2 provides better efficiency than the use of only the second rotating machine MG2.

Even when the required drive power Prdem is in the EV running region, the hybrid control portion 134 establishes the HV running mode, for example, in a case in which the state-of-charge value SOC of the battery 24 becomes less than a predetermined engine-start threshold value or in a case in which the engine 12 needs to be warmed up. The engine-start threshold value is a predetermined threshold value for determining that the state-of-charge value SOC reaches a level at which the battery 24 needs to be charged by automatically starting the engine 12.

The hybrid control portion 134 functionally includes an engine-start control means in the form of an engine-start control portion 134c that is configured, upon satisfaction of a predetermined engine-start condition RMst, to execute an engine automatic-start control CTst for causing the engine 12 to be automatically started. The predetermined engine-start condition RMst is, for example, that the HV running mode is established when operation of the engine 12 has been stopped, and/or that a known idle-stop control (by which the engine 12 is temporarily stopped in response to stop of running of the four-wheel drive vehicle 10 when the engine 12 has been operated in the HV running mode) is cancelled. The engine-start control portion 134c determines whether the engine-start condition RMst is satisfied or not, and determines that the start of the engine 12 is requested when determining that the engine-start condition RMst is satisfied. When determining that the start of the engine 12 is requested, the engine-start control portion 134c executes the engine automatic-start control CTst.

When executing the engine automatic-start control CTst, the engine-start control portion 134c causes the engine rotational speed Ne to be increased by, for example, the first rotating machine MG1, and then causes the engine 12 to be rotated by itself by supplying fuel to the engine 12 and igniting the engine 12 when the engine rotational speed Ne has been increased to a predetermined ignitable rotational speed Neigf or higher. The predetermined ignitable rotational speed Neigf is, for example, a predetermined speed value of the engine rotational speed Ne at which a complete combustion can be made in the engine 12 that is being self-rotated after an initial combustion of the engine 12. After the combustion of the engine 12 has been stabilized as a result of the complete combustion, the engine-start control portion 134c completes a series of steps of the engine automatic-start control CTst, by controlling the engine rotational speed Ne to a target engine rotational speed Netgt that is a target speed value of the engine rotational speed Ne. The target engine rotational speed Netgt, which is the target speed value of the engine rotational speed Ne after the complete combustion of the engine 12 in the engine automatic-start control CTst, is a predetermined engine-start rotational speed Nestf such as the above-described optimum engine rotational speed Neb and an idling rotational speed Neidl. In the following description, the target engine rotational speed Netgt after the complete combustion of the engine 12 in the engine automatic-start control CTst will be referred to as "target engine-start rotational speed Nesttgt".

The hybrid control portion 134 functionally includes an engine-stop control means in the form of an engine-stop control portion 134d that is configured, upon satisfaction of a predetermined engine-stop condition RMsp, to execute an engine automatic-stop control CTsp for causing the engine 12 to be automatically stopped. The predetermined engine-stop condition RMsp is, for example, that the EV running mode is established when operation of the engine 12 has been operated, and/or that the idle-stop control is executed in response to stop of running of the four-wheel drive vehicle 10 when the engine 12 has been operated in the HV running mode. The engine-stop control portion 134d determines whether the engine-stop condition RMsp is satisfied or not, and determines that stop of the engine 12 is requested when determining that the engine-stop condition RMsp is satisfied. When determining that the stop of the engine 12 is requested, the engine-stop control portion 134d executes the engine automatic-stop control CTsp.

When the engine automatic-stop control CTsp is executed, the engine-stop control portion 134d stops the fuel supply to the engine 12. In this instance, the engine-stop control portion 134d may control the MG1 torque Tg, for example, such that the MG1 torque Tg provides the engine 12 with a torque that reduces the engine rotational speed Ne, so as to quickly reduce the engine rotational speed Ne and quickly stop rotation of the engine 12.

The four-wheel-drive control portion 136 executes a drive-power distribution control CTx for adjusting the rear-wheel-side drive-power distribution ratio Xr. The four-wheel-drive control portion 136 determines a target ratio value of the rear-wheel-side drive-power distribution ratio Xr, which is dependent on the running state of the four-wheel drive vehicle 10 that is obtained through, for example, the output speed sensor 104 and the G sensor 118. Then, the four-wheel-drive control portion 136 outputs the electric-motor control command signal Sw for controlling the electric motor 86 such that the rear-wheel-side drive-power distribution ratio Xr is adjusted to the target ratio value with the torque capacity of the front-wheel drive clutch 70 being adjusted.

When the four-wheel drive vehicle 10 is running straight, for example, the four-wheel-drive control portion 136 controls the rear-wheel-side drive-power distribution ratio Xr to 1.0, namely, controls the drive-power distribution ratio Rx to 0:100, by releasing the front-wheel drive clutch 70. Further, when the vehicle 10 is turning, the four-wheel-drive control portion 136 calculates a target yaw rate Vyawtgt, based on, for example, the steering angle θsw and the vehicle running speed Vv during turning of the vehicle 10, and adjusts the rear-wheel-side drive-power distribution ratio Xr such that the yaw rate Vyaw, which is constantly detected by the yaw rate sensor 122, follows the target yaw rate Vyawtgt.

By the way, the power transmission apparatus 18 has a resonance rotational speed Nx that is dependent on, for example, its mass m and torsional rigidity k. Meanwhile, in the four-wheel drive vehicle 10, the rear-wheel-side drive-power distribution ratio Xr is adjusted within the range of 1.0-0.5, namely, the drive-power distribution ratio Rx between the front and rear wheels 14, 16 is adjusted within the range from 0:100 to 50:50. That is, in the vehicle 10, a drive system to which the engine 12 is connected in a power transmittable manner, is changed depending on the rear-wheel-side drive-power distribution ratio Xr, wherein the drive system is constituted by ones of the rotary members and elements which are included in the power transmission apparatus 18 and which cooperate with each other to a power transmission path through which the drive power is to be transmitted from the engine 12 toward the wheels 14, 16. Therefore, in the vehicle 10, the mass m and the torsional rigidity k of the drive system are changed depending on the rear-wheel-side drive-power distribution ratio Xr, and the resonance rotational speed Nx of the drive system is changed depending on the rear-wheel-side drive-power distribution ratio Xr. When the engine automatic-start control CTst is executed in the vehicle 10, there is a risk of undesirable increase of the NV as a result of increase of vibration of the drive system which is caused by occurrence of resonance of the drive system due to the torque fluctuation of the engine 12. In execution of the engine automatic-start control CTst, the resonance of the drive system caused when the target engine-start rotational speed Nesttgt is kept at the resonance rotational speed Nx of the drive system or in the vicinity of the resonance rotational speed Nx is likely to be more problematic than the resonance of the drive system caused when the engine rotational speed Ne passes through the resonance rotational speed Nx of the drive system during process of increase of the engine rotational speed Ne. In the following description, the target engine-start rotational speed Nesttgt will be discussed in connection with frequency of the torque fluctuation of the engine 12 that could cause problematic resonance of the drive system. It is noted that the drive system may be referred also to as "power-transmission-path defining portion" that is included in the power transmission apparatus 18. It is also noted that the resonance rotational speed Nx of the drive system may be defined as a speed value of the rotational speed of the drive system by which the resonance of the drive system is caused to occur, and that the rotational speed of the drive system may be defined as, for example, an input rotational speed of the power transmission apparatus 18 which corresponds to a rotational speed of the connection shaft 48 and the engine rotational speed Ne. In an arrangement in which the rotational speed of the drive system is always substantially equal to the engine rotational speed Ne, it is possible to interpret that the resonance rotational speed Nx of the drive system is also the resonance rotational speed Nx of the engine 12, namely, a speed value of the engine rotational speed Ne by which the resonance of the drive system is caused to occur.

When the engine automatic-start control CTst is to be executed, the engine-start control portion 134c changes the target engine-start rotational speed Nesttgt from the predetermined engine-start rotational speed Nestf to a changed engine rotational speed, depending on the rear-wheel-side drive-power distribution ratio Xr, wherein the changed engine rotational speed is distant from the resonance rotational speed Nx of the drive system, such that a difference of the changed engine rotational speed from the resonance rotational speed Nx is larger than a difference of the predetermined engine-start rotational speed Nestf from the resonance rotational speed Nx.

The electronic control apparatus 130 further includes a vehicle-state obtaining means in the form of a vehicle-state obtaining portion 138, for realizing the four-wheel drive vehicle 10 capable of suppressing or preventing increase of the NV due to increase of vibration of the drive system upon execution of the engine automatic-start control CTst.

When it is determined by the engine-start control portion 134c that the start of the engine 12 is requested, the vehicle-state obtaining portion 138 obtains an environmental information that is required to calculate a natural frequency f of the drive system. For example, the vehicle-state obtaining portion 138 obtains the rear-wheel-side drive-power distribution ratio Xr as a value representing a control state of the drive-power distribution control CTx executed by the four-wheel-drive control portion 136. The natural frequency is synonymous with a resonance frequency.

The vehicle-state obtaining portion 138 calculates the mass m of the drive system, by applying the rear-wheel-side drive-power distribution ratio Xr to a drive-system mass map MAPm, for example. Further, the vehicle-state obtaining portion 138 calculates the torsional rigidity k of the drive system, by applying the rear-wheel-side drive-power distribution ratio Xr to a drive-system torsional-rigidity map MAPk, for example. The drive-system mass map MAPm represents a predetermined relationship between the rear-wheel-side drive-power distribution ratio Xr and the mass m of the drive system. The drive-system torsional-rigidity map MAPk represents a predetermined relationship between the rear-wheel-side drive-power distribution ratio Xr and the torsional rigidity k of the drive system.

The vehicle-state obtaining portion 138 calculates the natural frequency f of the drive system, based on the mass m and the torsional rigidity k of the drive system that are dependent on the rear-wheel-side drive-power distribution ratio Xr. The calculation for the natural frequency f of the drive system is made by using, for example, equation (1) that is shown in a flow chart of FIG. 7 (see step S30 in the flow chart of FIG. 7). The natural frequency f of the drive system corresponds to the resonance rotational speed Nx of the drive system. That is, the vehicle-state obtaining portion 138 calculates the resonance rotational speed Nx of the drive system, based on the rear-wheel-side drive-power distribution ratio Xr.

When the engine automatic-start control CTst is to be executed, the engine-start control portion 134c sets the target engine rotational speed Netgt to the changed engine rotational speed that is different, by a predetermined speed value ANest, from the resonance rotational speed Nx that has been calculated by the vehicle-state obtaining portion 138. The changed engine rotational speed, to which the target engine-start rotational speed Nesttgt is set, may be either higher or lower than the resonance rotational speed Nx of the drive system. The predetermined speed value ANest is a predetermined value for setting the changed engine rotational speed as the target engine rotational speed Netgt, which makes it possible to avoid or suppress occurrence of the resonance of the drive system and to suppress an amount of change of the target engine rotational speed Netgt from the predetermined engine-start rotational speed Nestf to the changed engine rotational speed.

There might be a case in which the drive-power distribution control CTx cannot be satisfactorily executed due to a failure such as an electrical failure in which the electric-motor control command signal Sw, i.e, a drive current is not being successfully supplied to the electric motor 86. In the event of such an electrical failure, the electric motor 86 is placed in a freely rotatable state so that the frictional engagement elements 82 are not pressed by the piston 84 whereby the torque capacity of the front-wheel drive clutch 70 is made zero. That is, in the event of the electrical failure of the drive-power distribution control CTx, the front-wheel drive clutch 70 is released whereby the four-wheel drive vehicle 10 is placed in the two-wheel drive state in which the rear-wheel-side drive-power distribution ratio Xr is 1.0. In a case in which the drive-power distribution control CTx cannot be satisfactorily executed due to the above-described failure when it is determined by the engine-start control portion 134c that the start of the engine 12 is requested, the vehicle-state obtaining portion 138 sets the natural frequency f of the drive system to a two-wheel-drive-state natural frequency f that is a frequency value of the natural frequency f which is predetermined for the case in which the vehicle 10 is placed in the two-wheel drive state, namely, the rear-wheel-side drive-power distribution ratio Xr is 1.0.

Figure 7:
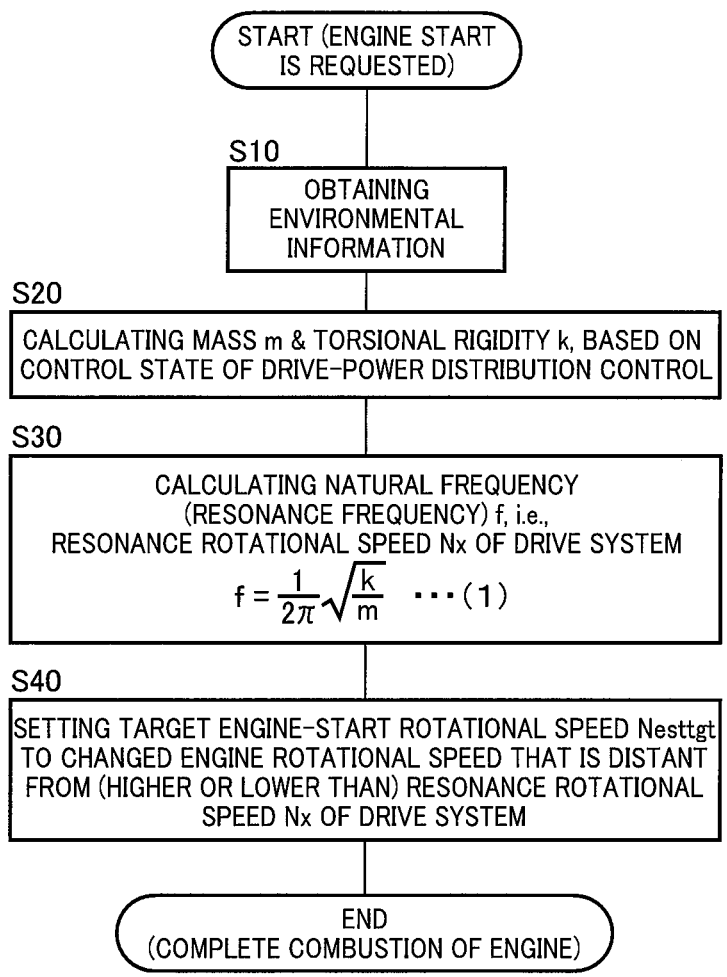
FIG. 7 is a flow chart showing a main part of a control routine executed by an electronic control apparatus, namely, a control routine that is executed for realizing a four-wheel drive vehicle that is capable of suppressing or preventing increase of NV due to increase of vibration of a drive system upon execution of an engine automatic-start control.

FIG. 7 is a flow chart showing a main part of a control routine executed by the electronic control apparatus 130, namely, a control routine that is executed for realizing the four-wheel drive vehicle 10 that is capable of suppressing or preventing increase of the NV due to increase of the vibration of the drive system upon execution of the engine automatic-start control CTst. This control routine is executed, for example, when the start of the engine 12 is requested.

As shown in FIG. 7, the control routine is initiated with step S10 corresponding to function of the vehicle-state obtaining portion 138, which is implemented to obtain the above-described environmental information such as the rear-wheel-side drive-power distribution ratio Xr as the value representing the control state of the drive-power distribution control CTx. Then, at step S20 corresponding to function of the vehicle-state obtaining portion 138, the mass m and the torsional rigidity k of the drive system are calculated based on the rear-wheel-side drive-power distribution ratio Xr. Step S20 is followed by step S30 corresponding to function of the vehicle-state obtaining portion 138, which is implemented to calculate the natural frequency f, i.e., the resonance rotational speed Nx of the drive system, based on the mass m and the torsional rigidity k of the drive system, by using the equation (1) shown in the flow chart of FIG. 7. Then, step S40 corresponding to function of the engine-start control portion 134c is implemented to set the target engine-start rotational speed Nesttgt to the changed engine rotational speed that is distant from the resonance rotational speed Nx of the drive system, and to execute the engine automatic-start control CTst. In execution of the engine automatic-start control CTst, the fuel supply to the engine 12 and the ignition of the engine 12 are made when the engine rotational speed Ne becomes the ignitable rotational speed Neigf, whereby the engine 12 is rotated by itself after the initial combustion. Then, the engine rotational speed Ne is controlled to the changed engine rotational speed as the target engine-start rotational speed Nesttgt, after the combustion is stabilized with the complete combustion.

As described above, in the present embodiment, the target engine-start rotational speed Nesttgt is changed, based on the rear-wheel-side drive-power distribution ratio Xr, from the predetermined engine-start rotational speed Nestf to the changed engine rotational speed, such that the difference of the changed engine rotational speed from the resonance rotational speed Nx that causes the resonance of the drive system is larger than the difference of the predetermined engine-start rotational speed Nestf from the resonance rotational speed Nx, whereby occurrence of the resonance of the drive system due to torque fluctuation of the engine 12 is suppressed or avoided upon execution of the engine automatic-start control CTst. Therefore, when the engine automatic-start control CTst is executed, it is possible to suppress or prevent increase of the NV due to increase of vibration of the drive system.

In the present embodiment, the target engine-start rotational speed Nesttgt is set to the changed engine rotational speed that is different, by the predetermined speed value ΔNest, from the resonance rotational speed Nx that is calculated based on the rear-wheel-side drive-power distribution ratio Xr, so that the occurrence of the resonance of the drive system due to the torque fluctuation of the engine 12 is appropriately suppressed or avoided. Further, the predetermined speed value ΔNest is a predetermined value for setting the changed engine rotational speed as the target engine-start rotational speed Nesttgt, which makes it possible to avoid or suppress the occurrence of resonance of the drive system and to suppress an amount of change of the target engine-start rotational speed Nesttgt from the predetermined engine-start rotational speed Nestf to the changed engine rotational speed, so that, upon execution of the engine automatic-start control CTst, the occurrence of the resonance of the drive system is appropriately suppressed or avoided with the amount of change of the target engine-start rotational speed Nesttgt from the predetermined engine-start rotational speed Nestf being suppressed.

In the present embodiment, the predetermined engine-start rotational speed Nestf is the optimum engine rotational speed Neb, which maximizes an energy efficiency in the four-wheel drive vehicle. With the target engine-start rotational speed Nesttgt being changed from the optimum engine rotational speed Neb to the changed engine rotational speed, the difference of the target engine-start rotational speed Nesttgt from the resonance rotational speed Nx of the drive system is increased, so that increase of the NV can be suppressed or prevented while reduction of the energy efficiency can be suppressed. Further, where the target engine-start rotational speed Nesttgt is set to the changed engine rotational speed that is different, by the predetermined speed value ΔNest, from the resonance rotational speed Nx, the amount of change of the target engine-start rotational speed Nesttgt from the optimum engine rotational speed Neb is suppressed whereby the reduction of the energy efficiency is appropriately suppressed.

There will be described another embodiment of this invention. The same reference signs as used in the above-described first embodiment will be used in the following embodiment, to identify the functionally corresponding elements, and descriptions thereof are not provided.

Second Embodiment

In the above-described first embodiment, the target engine-start rotational speed Nesttgt is changed from the predetermined engine-start rotational speed Nestf to the changed engine rotational speed, whereby the target engine-start rotational speed Nesttgt was made distant from the resonance rotational speed Nx of the drive system. However, the target engine-start rotational speed Nesttgt can be made distant from the resonance rotational speed Nx of the drive system, by changing the resonance rotational speed Nx of the drive system, in place of changing the target engine-start rotational speed Nesttgt.

In this second embodiment, when the engine automatic-start control CTst is to be executed by the engine-start control portion 134c, the four-wheel-drive control portion 136 changes the rear-wheel-side drive-power distribution ratio Xr, from an unchanged distribution rate that is a rate value of the rear-wheel-side drive-power distribution ratio Xr when the engine automatic-start control CTst is not executed, to a changed distribution rate, such that a difference of the resonance rotational speed Nx of the drive system from the predetermined engine-start rotational speed Nestf is increased by change of the rear-wheel-side drive-power distribution ratio Xr from the unchanged distribution rate to the changed distribution rate.

The electronic control apparatus 130 includes, in addition to a function of changing the target engine rotational speed Netgt, a function of changing the rear-wheel-side drive-power distribution ratio Xr upon the execution of the engine automatic-start control CTst, from the above-described unchanged distribution rate to the above-described changed distribution rate, such that the difference of the resonance rotational speed Nx of the drive system from the predetermined engine-start rotational speed Nestf is increased by the change of the rear-wheel-side drive-power distribution ratio Xr from the unchanged distribution rate to the changed distribution rate. The electronic control apparatus 130 is configured, upon the execution of the engine automatic-start control CTst, to execute one of change of the target engine rotational speed Netgt and change of the rear-wheel-side drive-power distribution ratio Xr, which is selected depending on a vehicle state that is a state of the four-wheel drive vehicle 10.

Figure 8:
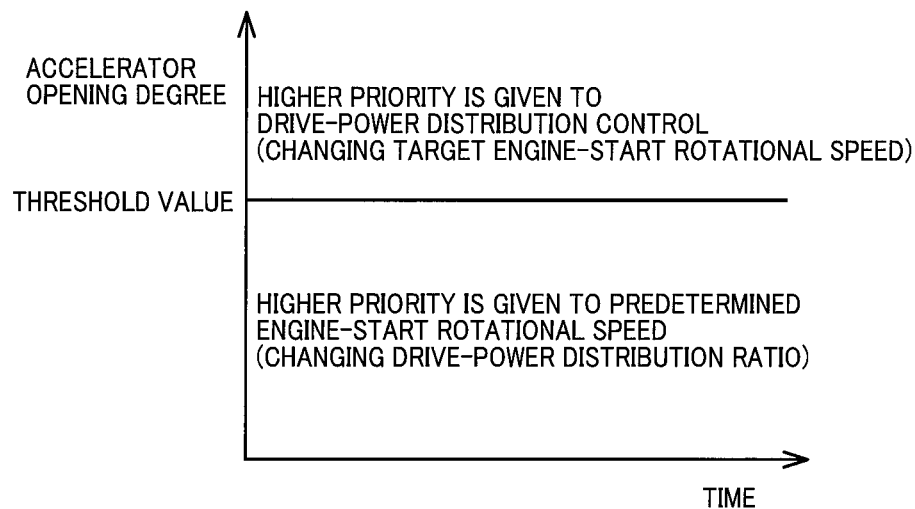
FIG. 8 is a view for explaining an example of a case in which one of a target engine rotational speed and a rear-wheel-side drive-power distribution ratio, which is selected depending on an accelerator opening degree, is changed upon execution of an engine automatic-start control.

When the amount of the acceleration operation made by the vehicle driver is large, for example, upon sudden start operation or sudden acceleration operation, it is preferable that a vehicle motion controllability is affected as little as possible, so that a higher priority is given to the vehicle motion controllability by the drive-power distribution control CTx, rather than to improvement of the energy efficiency. As shown in FIG. 8, when the accelerator opening degree θacc as a parameter indicative of the vehicle state is not smaller than a threshold value θaccf, the higher priority is given to the drive-power distribution control CTx, so that the electronic control apparatus 130 causes the difference of the target engine-start rotational speed Nesttgt from the resonance rotational speed Nx of the drive system to be increased by changing the target engine-start rotational speed Nesttgt. On the other hand, as shown in FIG. 8, when the accelerator opening degree θacc is smaller than the threshold value θaccf, the higher priority is given to the engine automatic-start control CTst with predetermined engine-start rotational speed Nestf, so that the electronic control apparatus 130 causes the difference of the target engine-start rotational speed Nesttgt from the resonance rotational speed Nx of the drive system to be increased by changing the rear-wheel-side drive-power distribution ratio Xr. The threshold value θaccf of the accelerator opening degree θacc is a predetermined value which makes it possible to suppress or prevent increase of the NV, for example, upon execution of the engine automatic-start control CTst, by changing the target engine-start rotational speed Nesttgt from the predetermined engine-start rotational speed Nestf while suppressing affection to the vehicle motion controllability.

Figure 9:
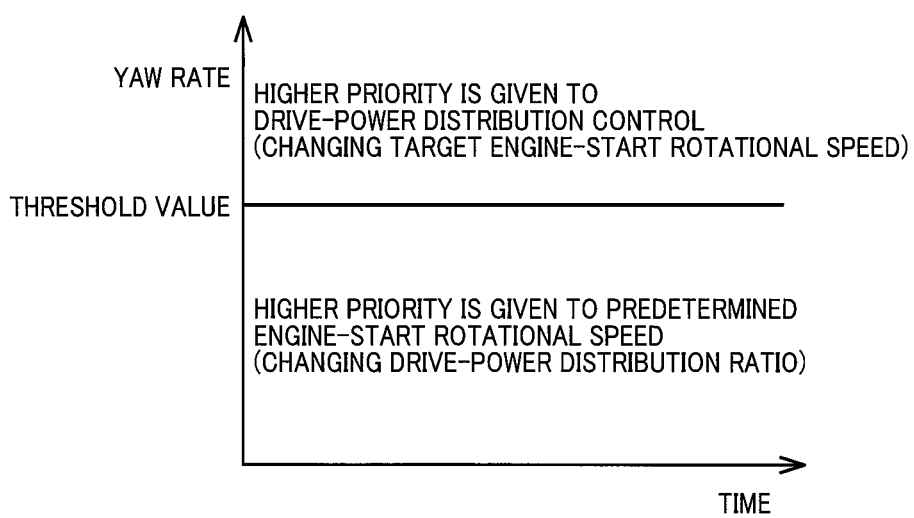
FIG. 9 is a view for explaining an example of a case in which one of the target engine rotational speed and the rear-wheel-side drive-power distribution ratio, which is selected depending on a yaw rate, is changed upon execution of the engine automatic-start control.

Alternatively, when a steering operation by the vehicle driver is large, it is preferable that the vehicle motion controllability is affected as little as possible, so that the higher priority is given to the vehicle motion controllability by the drive-power distribution control CTx, rather than to improvement of the energy efficiency. When the yaw rate Vyaw as a parameter indicative of the vehicle state is not smaller than a threshold value Vyawf (see FIG. 9), and/or when the steering angle θsw as another parameter indicative of the vehicle state is not smaller than a threshold value θswf (see FIG. 10), the higher priority is given to the drive-power distribution control CTx, so that the electronic control apparatus 130 causes the difference of the target engine-start rotational speed Nesttgt from the resonance rotational speed Nx of the drive system to be increased by changing the target engine-start rotational speed Nesttgt. On the other hand, when the accelerator opening degree θacc is smaller than the threshold value θaccf, (see FIG. 9), and/or when the steering angle θsw is smaller than the threshold value θswf (see FIG. 10), the higher priority is given to the engine automatic-start control CTst with predetermined engine-start rotational speed Nestf, so that the electronic control apparatus 130 causes the difference of the target engine-start rotational speed Nesttgt from the resonance rotational speed Nx of the drive system to be increased by changing the rear-wheel-side drive-power distribution ratio Xr. Each of the threshold value θaccf of the accelerator opening degree θacc and the threshold value θswf of the steering angle θsw is a predetermined value which makes it possible to suppress or prevent increase of the NV, for example, upon execution of the engine automatic-start control CTst, by changing the target engine-start rotational speed Nesttgt from the predetermined engine-start rotational speed Nestf while suppressing affection to the vehicle motion controllability.

Alternatively, when the steering operation is made by the vehicle driver, it is preferable that the vehicle motion controllability is affected as little as possible, so that the higher priority is given to the vehicle motion controllability by the drive-power distribution control CTx, rather than to improvement of the energy efficiency. As shown in FIG. 11, when turning of the four-wheel drive vehicle 10, which is a parameter indicative of the vehicle state, is made, a higher priority is given to the vehicle motion controllability by the drive-power distribution control CTx, rather than to improvement of the energy efficiency, so that the electronic control apparatus 130 causes the difference of the target engine-start rotational speed Nesttgt from the resonance rotational speed Nx of the drive system to be increased by changing the target engine-start rotational speed Nesttgt. On the other hand, as shown in FIG. 11, when straight running of the vehicle 10, which is a parameter indicative of the vehicle state, is made, the higher priority is given to the engine automatic-start control CTst with predetermined engine-start rotational speed Nestf, so that the electronic control apparatus 130 causes the difference of the target engine-start rotational speed Nesttgt from the resonance rotational speed Nx of the drive system to be increased by changing the rear-wheel-side drive-power distribution ratio Xr. Thus, in this control arrangement, the electronic control apparatus 130 executes one of change of the target engine-start rotational speed Nesttgt and change of the rear-wheel-side drive-power distribution ratio Xr, which is selected depending on whether the vehicle 10 is turning or running straight. Therefore, this control arrangement can be regarded, for example, as an example of the control arrangement shown in FIG. 9 in which the threshold value Vyawf of the yaw rate Vyaw is set to zero or a value close to zero, or as an example of the control arrangement shown in FIG. 10 in which the threshold value θswf of the steering angle θsw is set to zero or a value close to zero.

It is noted that control arrangements shown in respective FIGS. 8, 9, 10 and 11 do not all have to be provided in this second embodiment, as long as at least one of them is provided.

As described above, in the present embodiment, when the engine automatic-start control CTst is executed, a selected one of the change of the target engine-start rotational speed Nesttgt and the change of the rear-wheel-side drive-power distribution ratio Xr is executed whereby the difference of the target engine-start rotational speed Nesttgt from the resonance rotational speed Nx of the drive system is increased. Thus, the increase of the NV is suppressed or prevented with affection to the vehicle motion controllability being suppressed and with the amount of change of the target engine-start rotational speed Nesttgt from the predetermined engine-start rotational speed Nestf being suppressed. Where the predetermined engine-start rotational speed Nestf is the optimum engine rotational speed Neb, the reduction of the energy efficiency is suppressed.

In the present embodiment, when the accelerator opening degree θacc is not smaller than the threshold value θaccf, the target engine-start rotational speed Nesttgt is changed such that the difference of the changed engine rotational speed from the resonance rotational speed Nx is larger than the difference of the predetermined engine-start rotational speed Nestf from the resonance rotational speed Nx. Thus, in a situation with sudden start operation or sudden acceleration operation, a higher priority is given to the vehicle motion controllability by the drive-power distribution control CTx rather than to improvement of the energy efficiency. On the other hand, when the the accelerator opening degree θacc is smaller than the threshold value θaccf, the rear-wheel-side drive-power distribution ratio Xr is changed whereby the difference of the target engine-start rotational speed Nesttgt from the resonance rotational speed Nx of the drive system is increased. Thus, in a situation with slow start operation or slow acceleration operation, a higher priority is given to the improvement of the energy efficiency rather than to the vehicle motion controllability by the drive-power distribution control CTx. Therefore, the increase of the NV is suppressed or prevented with affection to the vehicle motion controllability being suppressed and with the amount of change of the target engine-start rotational speed Nesttgt from the predetermined engine-start rotational speed Nestf being suppressed. Where the predetermined engine-start rotational speed Nestf is the optimum engine rotational speed Neb, the reduction of the energy efficiency is suppressed.

In the present embodiment, when the yaw rate Vyaw is not smaller than the threshold value Vyawf, when the steering angle θsw is not smaller than the threshold value θswf, or when the four-wheel drive vehicle 10 is turning, the target engine-start rotational speed Nesttgt is changed such that the difference of the changed engine rotational speed from the resonance rotational speed Nx is larger than the difference of the predetermined engine-start rotational speed Nestf from the resonance rotational speed Nx. Thus, in a situation with large change of an attitude of the vehicle 10, a higher priority is given to the vehicle motion controllability by the drive-power distribution control CTx rather than to improvement of the energy efficiency. On the other hand, when the yaw rate Vyaw is smaller than the threshold value Vyawf, when the steering angle θsw is smaller than the threshold θswf, or when the vehicle 10 is running straight, the rear-wheel-side drive-power distribution ratio Xr is changed whereby the difference of the target engine-start rotational speed Nesttgt from the resonance rotational speed Nx of the drive system is increased. Thus, in a situation with small change of the attitude of the vehicle, a higher priority is given to the improvement of the energy efficiency rather than to the vehicle motion controllability by the drive-power distribution control CTx. Therefore, the increase of the NV is suppressed or prevented with affection to the vehicle motion controllability being suppressed and with the amount of change of the target engine-start rotational speed Nesttgt from the predetermined engine-start rotational speed Nestf being suppressed. Where the predetermined engine-start rotational speed Nestf is the optimum engine rotational speed Neb, the reduction of the energy efficiency is suppressed.

While the preferred embodiments of this invention have been described in detail by reference to the drawings, it is to be understood that the invention may be otherwise embodied.

For example, in the above-described first embodiment, the rear-wheel-side drive-power distribution ratio Xr is used as an example of a value representing the control state of the drive-power distribution control CTx, and the mass m and the torsional rigidity k of the drive system are calculated by applying the rear-wheel-side drive-power distribution ratio Xr to the drive-system mass map MAPm and the drive-system torsional-rigidity map MAPk. However, this arrangement is not essential. For example, as the value representing the control state of the drive-power distribution control CTx, it is also possible to use the electric-motor control command signal Sw supplied to the electric motor 86 or the pressing force by which the piston 84 is brought into contact with the frictional engagement elements 82 so as to press the first and second friction plates 82a, 82b, for example. Further, the mass m and the torsional rigidity k of the drive system may be calculated by using a predetermined function with an input parameter in the form of the value representing the control state of the drive-power distribution control CTx.

In the above-described second embodiment, one of the change of the target engine-start rotational speed Nesttgt and the change of the rear-wheel-side drive-power distribution ratio Xr is selected depending on whether the accelerator opening degree θacc is at least the threshold value θaccf or not, and the selected one is made. However, this arrangement is not essential. For example, one of the change of the target engine-start rotational speed Nesttgt and the change of the rear-wheel-side drive-power distribution ratio Xr may be selected depending on whether the requested drive amount such as the required drive force Frdem is at least a threshold value or not, in place of depending on whether the acceleration operation amount such as the accelerator opening degree θacc is at least the threshold value θaccf or not. Although there is a case in which the requested drive amount is a value calculated based on the acceleration operation amount such as the accelerator opening degree θacc, there is a case in which the requested drive amount is a value that is not dependent on the acceleration operation amount made by the vehicle driver, for example, in an automatic drive control or an automatic running-speed control. The requested drive amount is useful in the four-wheel drive vehicle where the four-wheel drive vehicle has control functions such as the automatic drive control and the automatic running-speed control.

In the above-described embodiments, the four-wheel drive vehicle 10 is a four-wheel drive vehicle based on a vehicle of FR (front engine and rear drive) system, and is a part-time four-wheel drive vehicle in which the two-wheel drive state and the four-wheel drive state are switchable to each other depending on the running state. Further, the four-wheel drive vehicle 10 in the above-described embodiments is a hybrid vehicle having the drive power sources in the form of the engine 12 and the first and second rotating machines MG1, MG2, and is a four-wheel drive vehicle provided with the automatic transmission 28 including the continuously-variable transmission portion 44 and the step-variable transmission portion 46 that are arranged in series. However, this arrangement is not essential. The present invention is applicable also to a four-wheel drive vehicle based on a vehicle of FF (front engine and front drive) system, a full-time four-wheel drive vehicle, a parallel-type hybrid vehicle in which drive powers of an engine and a rotating machine are to be transmitted to drive wheels, or a vehicle provided with a single drive power source in the form of an engine. Further, the present invention is applicable also to a four-wheel drive vehicle provided with an automatic transmission in the form of a known planetary-gear type automatic transmission, a known synchronous-meshing parallel-two-shaft-type transmission including DCT (dual clutch transmission), a known belt-type continuously variable transmission or an electrically-operated continuously variable transmission. It is noted that, in case of the four-wheel drive vehicle based on the vehicle of FF system, the front wheels serve as the main drive wheels while the rear wheels serve as the auxiliary drive wheels so that the front-wheel-side drive-power distribution ratio Xf is a ratio of the drive power transmitted to the main drive wheels. In case of the full-time four-wheel drive vehicle provided with a center differential gear device including a differential limiting clutch, for example, the drive-power distribution ratio Rx (that is the ratio of distribution of the drive power between the front wheels 14 and the rear wheels 16) is 50:50 when the differential limiting clutch is operated to limit or inhibit a differential motion of the center differential gear device, and the drive-power distribution ratio Rx is a predetermined ratio such as 30:70 when the differential limiting clutch is not operated. That is, the present invention is applicable to any four-wheel drive vehicle including: at least one drive power source including an engine; a drive-power distribution device configured to transmit a drive power of the drive power source toward main drive wheels and auxiliary drive wheels, at a drive-power distribution ratio that is a ratio of distribution of the drive power between the auxiliary drive wheels and the main drive wheels; and a control apparatus configured to execute a drive-power distribution control for adjusting the drive-power distribution ratio, and configured to execute an engine automatic-start control for causing the engine to be automatically started upon satisfaction of an engine-start condition.

In the above-described embodiments, the front-wheel drive clutch 70 of the transfer 30 is constructed such that, when the electric motor 86 is rotated, the piston 84 is moved through the cam mechanism 90 in a direction toward the frictional engagement elements 82, so as to press the frictional engagement elements 82. However, this construction is not essential. For example, the front-wheel drive clutch 70 may include a ball screw configured to covert a rotation motion into a linear motion, such that the piston 84 is moved, upon rotation of the electric motor 86, through the ball screw, in the direction toward the frictional engagement elements 82, so as to press the frictional engagement elements 82. Further, the front-wheel drive clutch 70 may include a hydraulic actuator by which the piston 84 is to be moved in the direction toward the frictional engagement elements 82.

It is to be understood that the embodiments described above are given for illustrative purpose only, and that the present invention may be embodied with various modifications and improvements which may occur to those skilled in the art.

NOMENCLATURE OF ELEMENTS

10: four-wheel drive vehicle
12: engine (drive power source)
14 (14L, 14R): front wheels (auxiliary drive wheels)
16 (16L, 16R): rear wheels (main drive wheels)
30: transfer (drive-power distribution device)
130: electronic control apparatus (control apparatus)

What is claimed is:

1. A four-wheel drive vehicle comprising:
   main drive wheels and auxiliary drive wheels;
   at least one drive power source including an engine;
   a drive-power distribution device configured to transmit a drive power of the drive power source toward the main drive wheels and the auxiliary drive wheels, at a drive-power distribution ratio that is a ratio of distribution of the drive power between the auxiliary drive wheels and the main drive wheels; and
   a control apparatus configured to execute a drive-power distribution control for adjusting the drive-power distribution ratio, and configured to execute an engine automatic-start control for causing the engine to be automatically started upon satisfaction of an engine-start condition,
   wherein the control apparatus is configured, upon execution of the engine automatic-start control, to change a target engine rotational speed that is a target speed value of a rotational speed of the engine after a complete combustion of the engine, from a predetermined engine-start rotational speed, to a changed engine rotational speed, depending on the drive-power distribution ratio, such that a difference of the changed engine rotational speed from a resonance rotational speed that causes resonance of a drive system to which the engine is connected in a power transmittable manner, is larger than a difference of the predetermined engine-start rotational speed from the resonance rotational speed.

2. The four-wheel drive vehicle according to claim 1, wherein the control apparatus is configured to set the target engine rotational speed to the changed engine rotational speed that is different, by a predetermined speed value, from the resonance rotational speed that is calculated based on the drive-power distribution ratio, and
   wherein the predetermined speed value is a predetermined value for setting the changed engine rotational speed as the target engine rotational speed, which makes it possible to avoid or suppress occurrence of resonance of the drive system and to suppress an amount of change of the target engine rotational speed from the predetermined engine-start rotational speed to the changed engine rotational speed.

3. The four-wheel drive vehicle according to claim 1, wherein the predetermined engine-start rotational speed is an optimum speed value of the rotational speed of the engine, which maximizes an energy efficiency in the four-wheel drive vehicle.

4. The four-wheel drive vehicle according to claim 1, wherein the control apparatus includes, in addition to a function of changing the target engine rotational speed, a function of changing the drive-power distribution ratio upon the execution of the engine automatic-start control, from an unchanged distribution ratio that is a ratio value of the drive-power distribution ratio when the engine automatic-start control is not executed, to a changed distribution ratio, such that the difference of the predetermined engine-start rotational speed from the resonance rotational speed is increased by change of the drive-power distribution ratio from the unchanged distribution ratio to the changed distribution ratio, and
   wherein the control apparatus is configured, upon the execution of the engine automatic-start control, to execute one of change of the target engine rotational speed and change of the drive-power distribution ratio, which is selected depending on a state of the four-wheel drive vehicle.

5. The four-wheel drive vehicle according to claim 4, wherein the control apparatus is configured, when an accelerating operation amount or a requested drive amount is not smaller than a threshold value, to change the target engine rotational speed such that the difference of the changed engine rotational speed from the resonance rotational speed is larger than the difference of the predetermined engine-start rotational speed from the resonance rotational speed, and is configured, when the accelerating operation amount or the requested drive amount is smaller than the threshold value, to change the drive-power distribution ratio such that the difference of the predetermined engine-start rotational speed from the resonance rotational speed is increased by the changed ratio value of the drive-power distribution ratio.

6. The four-wheel drive vehicle according to claim 4, wherein the control apparatus is configured, when a yaw rate is not smaller than a threshold value, to change the target engine rotational speed such that the difference of the changed engine rotational speed from the resonance rotational speed is larger than the difference of the predetermined engine-start rotational speed from the resonance rotational speed, and is configured, when the yaw rate is smaller than the threshold value, to change the drive-power distribution ratio such that the difference of the predetermined engine-start rotational speed from the resonance rotational speed is increased by the changed ratio value of the drive-power distribution ratio.

7. The four-wheel drive vehicle according to claim 4,
wherein the control apparatus is configured, when a steering angle is not smaller than a threshold value, to change the target engine rotational speed such that the difference of the changed engine rotational speed from the resonance rotational speed is larger than the difference of the predetermined engine-start rotational speed from the resonance rotational speed, and is configured, when the steering angle is smaller than the threshold value, to change the drive-power distribution ratio such that the difference of the predetermined engine-start rotational speed from the resonance rotational speed is increased by the changed ratio value of the drive-power distribution ratio.

8. The four-wheel drive vehicle according to claim 4,
wherein the control apparatus is configured, when the four-wheel drive vehicle is turning, to change the target engine rotational speed such that the difference of the changed engine rotational speed from the resonance rotational speed is larger than the difference of the predetermined engine-start rotational speed from the resonance rotational speed, and is configured, when the four-wheel drive vehicle is running straight, to change the drive-power distribution ratio such that the difference of the predetermined engine-start rotational speed from the resonance rotational speed is increased by the changed ratio value of the drive-power distribution ratio.

* * * * *